(12) United States Patent
Bookbinder et al.

(10) Patent No.: US 10,429,553 B2
(45) Date of Patent: Oct. 1, 2019

(54) OPTICAL ASSEMBLY HAVING MICROLOUVERS

(71) Applicant: Corning Incorporated, Corning, NY (US)

(72) Inventors: Dana Craig Bookbinder, Corning, NY (US); Garrett Andrew Piech, Corning, NY (US); James Andrew West, Painted Post, NY (US)

(73) Assignee: Corning Incorporated, Corning, NY (US)

( * ) Notice: Subject to any disclaimer, the term of this patent is extended or adjusted under 35 U.S.C. 154(b) by 19 days.

(21) Appl. No.: 15/552,417

(22) PCT Filed: Feb. 24, 2016

(86) PCT No.: PCT/US2016/019214
§ 371 (c)(1),
(2) Date: Aug. 21, 2017

(87) PCT Pub. No.: WO2016/138054
PCT Pub. Date: Sep. 1, 2016

(65) Prior Publication Data
US 2018/0045863 A1 Feb. 15, 2018

Related U.S. Application Data

(60) Provisional application No. 62/121,739, filed on Feb. 27, 2015.

(51) Int. Cl.
*G02B 5/02* (2006.01)
*F21V 8/00* (2006.01)
(Continued)

(52) U.S. Cl.
CPC ......... *G02B 5/0278* (2013.01); *G02B 5/0236* (2013.01); *G02B 5/0268* (2013.01);
(Continued)

(58) Field of Classification Search
CPC .... G02B 5/001; G02B 5/0278; G02B 5/0236; G02B 5/0268; G02B 6/0038; G02B 6/005; G02F 1/133504; G02F 1/133526
(Continued)

(56) References Cited

U.S. PATENT DOCUMENTS 2,682,134 A 6/1954 Stookey
2,749,794 A 6/1956 O'Leary
(Continued)

FOREIGN PATENT DOCUMENTS

EP 468480 A2 7/1991
EP 1974848 A1 10/2008
(Continued)

OTHER PUBLICATIONS

Akarapu et al. Pending U.S. Appl. No. 15/718,848, filed Sep. 28, 2017. "Apparatuses and Methods for Laser Processing Transparent Workpieces Using Non-Axisymmetric Beam Spots".
(Continued)

*Primary Examiner* — Collin X Beatty
(74) *Attorney, Agent, or Firm* — Russell S. Magaziner

(57) ABSTRACT

An optical assembly includes a transparent substrate having a first major surface and a second major surface. The transparent substrate includes one or more damage layers disposed between a first non-damage layer and a second non-damage layer. Elongated laser-induced damage tracks are disposed within the damaged layer(s) to form at least one area pattern so that light directed toward the transparent substrate at an angle that exceeds a predetermined viewing angle (θ) is scattered by the plurality of laser-induced damage tracks. Alternatively, if light is directed toward the transparent substrate at an angle that is less than the predetermined viewing angle (θ), it is transmitted by the transparent substrate.

20 Claims, 18 Drawing Sheets

(51) Int. Cl.
*G02F 1/1335* (2006.01)
*G02B 5/00* (2006.01)

(52) U.S. Cl.
CPC ............ *G02B 6/005* (2013.01); *G02B 6/0038* (2013.01); *G02F 1/133504* (2013.01); *G02B 5/001* (2013.01); *G02F 1/133526* (2013.01)

(58) Field of Classification Search
USPC .................................................. 359/599
See application file for complete search history.

(56) References Cited

U.S. PATENT DOCUMENTS

| | | |
|---|---|---|
| 4,600,667 A | 7/1986 | Uchida |
| 4,670,095 A | 6/1987 | Negishi |
| 4,777,116 A | 10/1988 | Kawatsuki et al. |
| 4,971,895 A | 11/1990 | Sullivan |
| 5,104,210 A * | 4/1992 | Tokas .................. G02B 5/00 359/296 |
| 5,108,857 A | 4/1992 | Kitayama et al. |
| 5,112,722 A | 5/1992 | Tsujino et al. |
| 5,137,801 A | 8/1992 | Tsujino et al. |
| 5,767,935 A | 6/1998 | Ueda et al. |
| 5,851,700 A | 12/1998 | Honda et al. |
| 5,920,380 A | 7/1999 | Sweatt |
| 6,010,747 A | 1/2000 | Beeson et al. |
| 6,093,520 A | 7/2000 | Vladimirsky et al. |
| 6,261,664 B1 | 7/2001 | Beeson et al. |
| 6,262,845 B1 | 7/2001 | Sweatt |
| 7,436,469 B2 | 10/2008 | Gehlsen et al. |
| 7,446,827 B2 | 11/2008 | Ko et al. |
| 7,551,340 B2 | 6/2009 | Sumiyoshi et al. |
| 7,710,511 B2 | 5/2010 | Gehlsen et al. |
| 7,751,667 B2 | 7/2010 | Daniel et al. |
| 7,766,531 B2 | 8/2010 | Anderson et al. |
| 7,924,368 B2 | 4/2011 | Fabick et al. |
| 8,026,880 B2 | 9/2011 | Mimura et al. |
| 8,125,569 B2 | 2/2012 | Ko et al. |
| 8,233,114 B2 | 7/2012 | Mimura et al. |
| 8,395,726 B2 | 3/2013 | Shiota et al. |
| 8,444,885 B2 | 5/2013 | Lee et al. |
| 8,576,357 B2 | 11/2013 | Gehlsen et al. |
| 8,804,073 B2 | 8/2014 | Mimura et al. |
| 9,140,829 B2 * | 9/2015 | Park .................. G02B 5/0221 |
| 9,448,341 B2 | 9/2016 | Tsuji |
| 9,517,963 B2 | 12/2016 | Marjanovic et al. |
| 9,617,180 B2 | 4/2017 | Bookbinder et al. |
| 9,658,651 B2 | 5/2017 | Balogh |
| 9,676,167 B2 | 6/2017 | Marjanovic et al. |
| 9,687,936 B2 | 6/2017 | Marjanovic et al. |
| 9,701,563 B2 | 7/2017 | Bookbinder et al. |
| 9,701,564 B2 | 7/2017 | Bookbinder et al. |
| 2008/0014479 A1 | 6/2008 | Mimura et al. |
| 2009/0009861 A1 * | 1/2009 | Hyobu .................. G02B 5/0242 359/456 |
| 2010/0025387 A1 * | 2/2010 | Arai .................. B28D 5/00 219/121.69 |
| 2011/0088324 A1 | 4/2011 | Wessel |
| 2011/0217513 A1 | 9/2011 | Hwang |
| 2015/0165548 A1 | 6/2015 | Marjanovic et al. |
| 2015/0165560 A1 | 6/2015 | Hackert et al. |
| 2015/0165563 A1 | 6/2015 | Manley et al. |
| 2015/0166393 A1 | 6/2015 | Marjanovic et al. |
| 2015/0166394 A1 | 6/2015 | Marjanovic et al. |
| 2015/0168612 A1 * | 6/2015 | Lee .................. G02B 5/0221 359/599 |
| 2015/0232369 A1 | 8/2015 | Marjanovic et al. |
| 2015/0299018 A1 | 10/2015 | Bhuyan et al. |
| 2015/0360991 A1 | 12/2015 | Grundmueller et al. |
| 2016/0008927 A1 | 1/2016 | Grundmueller et al. |
| 2016/0009066 A1 | 1/2016 | Nieber et al. |
| 2016/0159679 A1 | 6/2016 | West |
| 2016/0200621 A1 | 7/2016 | N'Gom et al. |
| 2016/0279895 A1 | 9/2016 | Marjanovic et al. |
| 2016/0280580 A1 | 9/2016 | Bohme |
| 2016/0311717 A1 | 10/2016 | Nieber et al. |
| 2017/0001900 A1 | 1/2017 | Marjanovic et al. |
| 2017/0008122 A1 | 1/2017 | Wieland et al. |
| 2017/0008793 A1 | 1/2017 | Bankaitis et al. |
| 2017/0023841 A1 | 1/2017 | N'Gom et al. |
| 2017/0100801 A1 | 4/2017 | Becker et al. |
| 2017/0158550 A1 | 6/2017 | Genier |
| 2017/0158551 A1 | 6/2017 | Bookbinder et al. |
| 2017/0189991 A1 | 7/2017 | Gollier et al. |
| 2017/0189999 A1 | 7/2017 | Bookbinder et al. |

FOREIGN PATENT DOCUMENTS

| | | | |
|---|---|---|---|
| EP | 2143518 A1 | 1/2010 | |
| FR | 2458087 A1 | 12/1980 | |
| JP | 1040946 A | 2/1989 | |
| JP | 1147405 A | 6/1989 | |
| JP | 1147406 A | 6/1989 | |
| JP | 2054201 A | 2/1990 | |
| JP | 2280102 A | 11/1990 | |
| JP | 3156402 A | 7/1991 | |
| JP | 6094097 A | 4/1994 | |
| JP | 10040948 A | 2/1998 | |
| JP | 2001312915 A | 11/2001 | |
| JP | 2007272065 A | 10/2007 | |
| JP | 2009145410 A | 7/2009 | |
| JP | 2009258242 A | 11/2009 | |
| KR | 10-2014-0064220 A * | 5/2014 | ............ B32B 27/16 |
| WO | 2016154284 A1 | 9/2016 | |
| WO | 2017055576 A1 | 4/2017 | |

OTHER PUBLICATIONS

Comstock et al. Pending U.S. Appl. No. 15/689,456, filed Aug. 29, 2017. "Laser Cutting of Materials With Intensity Mapping Optical System".

Hackert et al. Pending U.S. Appl. No. 15/792,873, filed Oct. 25, 2017. "Glass Sheet Transfer Apparatuses for Laser-Based Machining of Sheet-Like Glass Substrates".

Hackert et al. Pending U.S. Appl. No. 62/332,618, filed May 6, 2016. "Laser Cutting and Removal of Contoured Shapes From Glass Substrates".

Heiss et al. Pending U.S. Appl. No. 62/544,208, filed Aug. 11, 2017. "Apparatuses and Methods for Synchronous Multi-Laser Processing of Transparent Workpieces".

Herrnberger et al. Pending U.S. Appl. No. 15/791,774, filed Oct. 24, 2017. "Substrate Processing Station for Laser-Based Machining of Sheet-Like Glass Substrates".

Honda et al. "A Novel Polymer Film that Controls Light Transmission". Progress in Pacific Polymer Science 3. 159-169 (1994).

Levesque et al. Pending U.S. Appl. No. 15/783,536, filed Oct. 13, 2017. "Silica Test Probe and Other Such Devices".

Liu et al. U.S. Appl. No. 62/456,774, filed Feb. 9, 2017. "Apparatuses and Methods for Laser Processing Transparent Workpieces Using Phase Shifted Focal Lines".

Maeda et al. "Optical performance of angle-dependent light-control glass", Proc. of SPIE 1536, Optical Materials Technology for Energy Efficiency and Solar Energy Conversion X, 138 (Dec. 1, 1991).

Mbise et al., "Angular selective window coatings: theory and experiments" J. Phys. D: Appl. Phys. 30 2103 (1997).

Nieber et al. Pending U.S. Appl. No. 15/795,870, filed Oct. 27, 2017. "Apparatuses and Methods for Laser Processing Laminate Workpiece Stacks".

Schnitzler et al. Pending U.S. Appl. No. 15/657,320, filed Jul. 24, 2017. "Apparatuses and Methods for Laser Processing".

Shealy et al., "Geometric optics-based design of laser beam shapers",Opt. Eng 42(11), 3123-3138 (2003). doi:10.1117/1.1617311.

Wieland et al. Pending U.S. Appl. No. 15/782,946, filed Oct. 13, 2017. "Creation of Glass Holes and Slots in Galss Substrates".

* cited by examiner

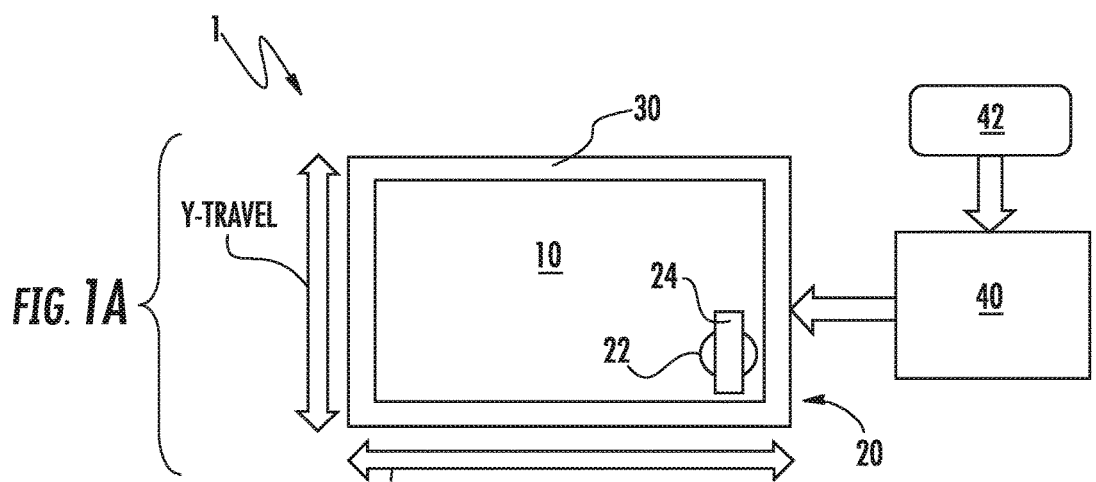
FIG. 1A
FIG. 1B
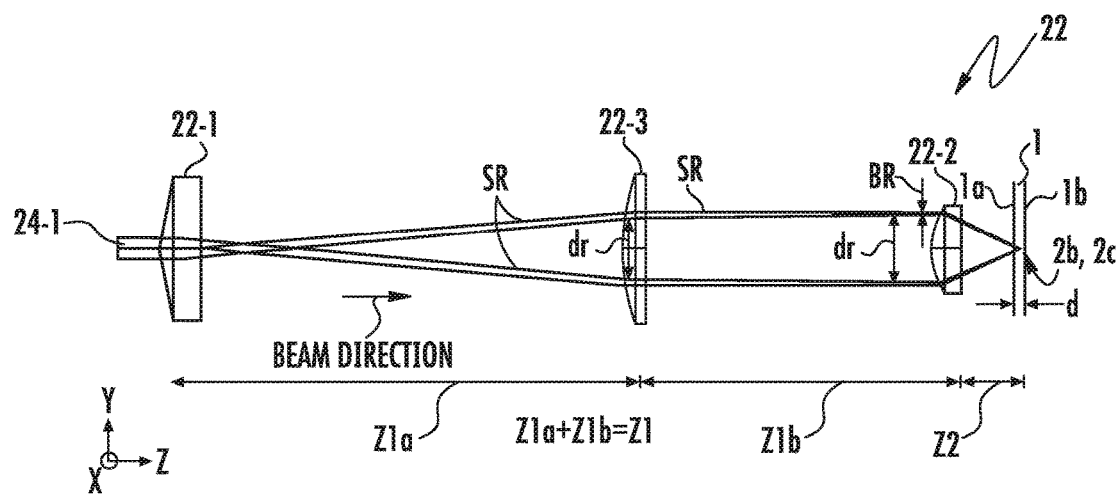
FIG. 2

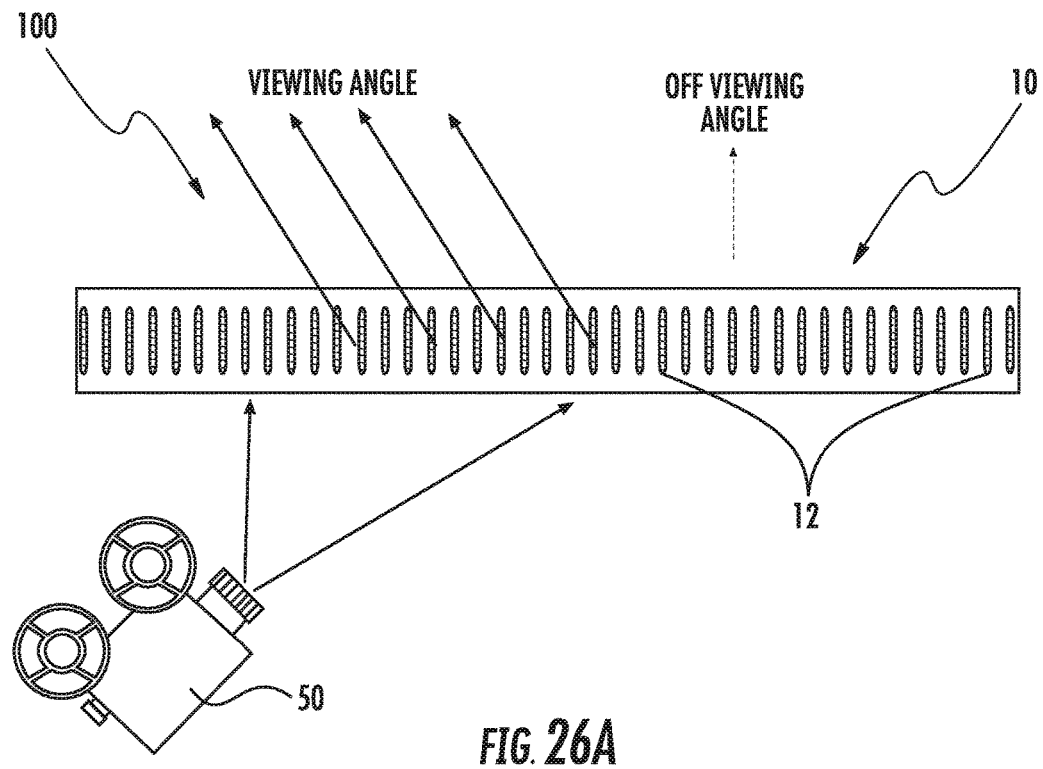
FIG. 26A
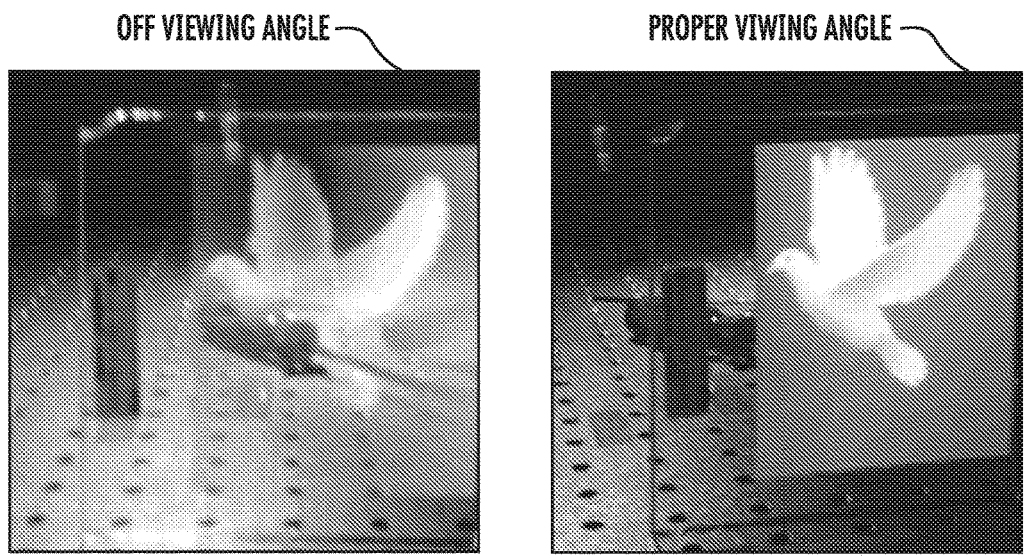
FIG. 26B
FIG. 26C

OPTICAL ASSEMBLY HAVING MICROLOUVERS

This application claims the benefit of priority to U.S. Application No. 62/121,739 filed on Feb. 27, 2015 the content of which is incorporated herein by reference in its entirety.

BACKGROUND

The disclosure relates to optical displays, and more particularly to optical displays that transmit light within a predetermined viewing angle.

Conventional glass is either transparent or opaque at all angles of incidence. However, it may be desirable to have a material whose transmission properties change as a function of angle for certain applications (e.g., privacy screens, advertising, architectural glass, etc.). A privacy screen is often used in conjunction with electronic device displays (such as cell-phone displays, computer displays, etc.) and is used to restrict the field of view (i.e., viewing angle) to prevent unwanted on-lookers from viewing the display from an oblique angle. While there are conventional technologies that are under consideration for these applications, they have various drawbacks associated with them.

With respect to privacy screen applications, various polymer-based films, or multi-ply films, have been used for this purpose. In one approach, the optical screen is formed by sandwiching a light diffusing layer between various external plastic layers. The sandwich also includes adhesive layers that melt in the presence of heat and pressure to bond the multi-ply assembly together. The light diffusing polymer layer is configured to include light absorbing microlouvers that can be formed by chemical or mechanical means. While these microlouvers provide a high degree of privacy for off-axis viewing, the on-axis transmission is reduced by about 36%; and thus, one drawback associated with this approach is that it yields a relatively dark-looking display. Moreover, while the display is removable and flexible, it is easily scratched. In order to increase the hardness of the screen, another layer of a relatively hard polyethylene terephthalate (PET) material may be employed. Of course, the use of an additional layer reduces flexibility and adds cost to process.

In another approach, a polymer-film that includes light diffracting (microstructure or nanostructure) layers is being considered for architectural applications. The nanostructure layers provide anisotropic scattering of light outside a predetermined viewing angle. This approach transmits approximately 90% of the incident light at normal incidence (or within a specified viewing angle). One drawback associated with this approach relates to the "yellowing" of the film in response to being exposed to ultraviolet (UV) light. For this reason, polymer films of this type are typically limited to interior applications. Moreover, this film is also easily scratched.

In yet another approach, various thin-film formulations are being considered for window coatings in both architectural and automotive applications for energy-conscious reasons (e.g., to block solar radiation and limit the need for air conditioning). Many of these thin films comprise metallic components such as Cr, Al, Ti, and W. Reflectivity and transmission angle selectivity may be implemented by oblique-angle sputtering of these materials. One of the drawbacks to this approach is that the angular selectivity of the resultant material is rather weak. Moreover, thin films of this type typically exhibit a strong off axis color shift.

In yet another approach, a relatively expensive glass-ceramic material that includes heavy metal ingredients has been considered. In this approach, a photosensitive glass-ceramic substrate is exposed to UV light to create opal crystals embedded in the substrate. One drawback to this approach, however, relates to the heat treatment that is required to crystallize the glass-ceramic substrate. The glass ceramic substrate is disposed on a bed of $CeO_2$ and then heated to 850° C. to prevent deformation and damage. The most obvious drawback, therefore, is that the material is prohibitively expensive from both an ingredient standpoint and a process standpoint.

In yet another brute-force energy-conscious approach, a sheet of light-diffracting spaced-apart louvers is formed and subsequently inserted between two panes of clear glass. The louvers are configured to block transmission of direct sunlight when the sun is at a predetermined angle above the horizon (or higher). One drawback associated with this approach relates to the difficulty associated with sandwiching a sheet of louvers between two sheets of glass to form a multi-ply composite structure.

The "smart window" is yet another approach that is under consideration. Smart windows typically include polymer dispersed liquid crystals, electrochromic materials or suspended particles that can be manipulated to provide opacity on demand. For example, liquid crystal smart windows are configured to switch from a light transmissive state to an opaque state in response to an applied voltage (or current). Unfortunately, this approach does not provide any angular selectivity; the display is either ON or it is OFF. Moreover, like some of the technologies considered above, the smart window approach requires a multi-layer assembly (i.e., it cannot be implemented within a single sheet of glass).

SUMMARY

Embodiments of the present disclosure provide a material that has transmission properties that change as a function of angle. Embodiments of the present disclosure provide a final product that can be integrated within a single sheet of glass (or other transparent substrate) so that the micro louvers are substantially protected from the environment. Moreover, embodiments of the present disclosure do not exhibit any of the darkening, yellowing or ageing effects associated with other approaches. Finally, embodiments of the present disclosure are directed to a digital process that provides customization of localized optical properties within the sheet.

One embodiment is directed to an optical assembly that includes a transparent substrate having a first major surface and a second major surface substantially opposite the first major surface. The transparent substrate has a predetermined thickness measured as a distance between the first major surface and the second major surface. The transparent substrate includes at least one damage layer substantially disposed between a first non-damage layer and a second non-damage layer. The first non-damaged layer substantially includes the first major surface and the second non-damaged layer substantially including the second major surface. A plurality of elongated laser-induced damage tracks are disposed within the at least one damaged layer to form at least one area pattern so that light directed toward the transparent substrate at an angle that exceeds a predetermined viewing angle ($\theta$) is scattered by the plurality of laser-induced damage tracks; and light directed toward the transparent substrate at an angle that is less than the predetermined viewing angle ($\theta$) is transmitted by the transparent substrate.

A further embodiment includes a method of making an optical assembly using an imaging system that includes a pulsed laser and an optical system configured to form the pulsed laser beam into a Gauss-Bessel beam which is focused to create a focal line. The method includes providing a predetermined mapping pattern that is configured to position a plurality of elongated laser-induced damage tracks within at least one damage layer substantially disposed between a first non-damage layer and a second non-damage layer of a transparent substrate. The imaging system is operated to implement the predetermined mapping pattern, wherein operating the imaging system includes forming each of the plurality of elongated laser-induced damage tracks by generating at least one line focus. The plurality of elongated laser-induced damage tracks form an area pattern corresponding to the predetermined mapping pattern, whereby light directed toward the transparent substrate at an angle that exceeds a predetermined viewing angle ($\theta$) is scattered by the plurality of laser-induced damage tracks.

Additional features and advantages will be set forth in the detailed description which follows, and in part will be readily apparent to those skilled in the art from that description or recognized by practicing the embodiments as described herein, including the detailed description which follows, the claims, as well as the appended drawings.

It is to be understood that both the foregoing general description and the following detailed description are merely exemplary, and are intended to provide an overview or framework to understanding the nature and character of the claims. The accompanying drawings are included to provide a further understanding, and are incorporated in and constitute a part of this specification. The drawings illustrate one or more embodiment(s), and together with the description serve to explain principles and operation of the various embodiments.

BRIEF DESCRIPTION OF THE DRAWINGS

FIGS. 1A and 1B are diagrammatic depictions of an assembly for making an optical sheet in accordance with one embodiment;

FIG. 2 is a diagrammatic depiction of the optical system used in the assembly depicted in FIGS. 1A and 1B;

FIGS. 26A-26C are various views of an optical assembly incorporating an optical sheet with integral microlouvers in accordance with another embodiment.

DETAILED DESCRIPTION

Figure 3:
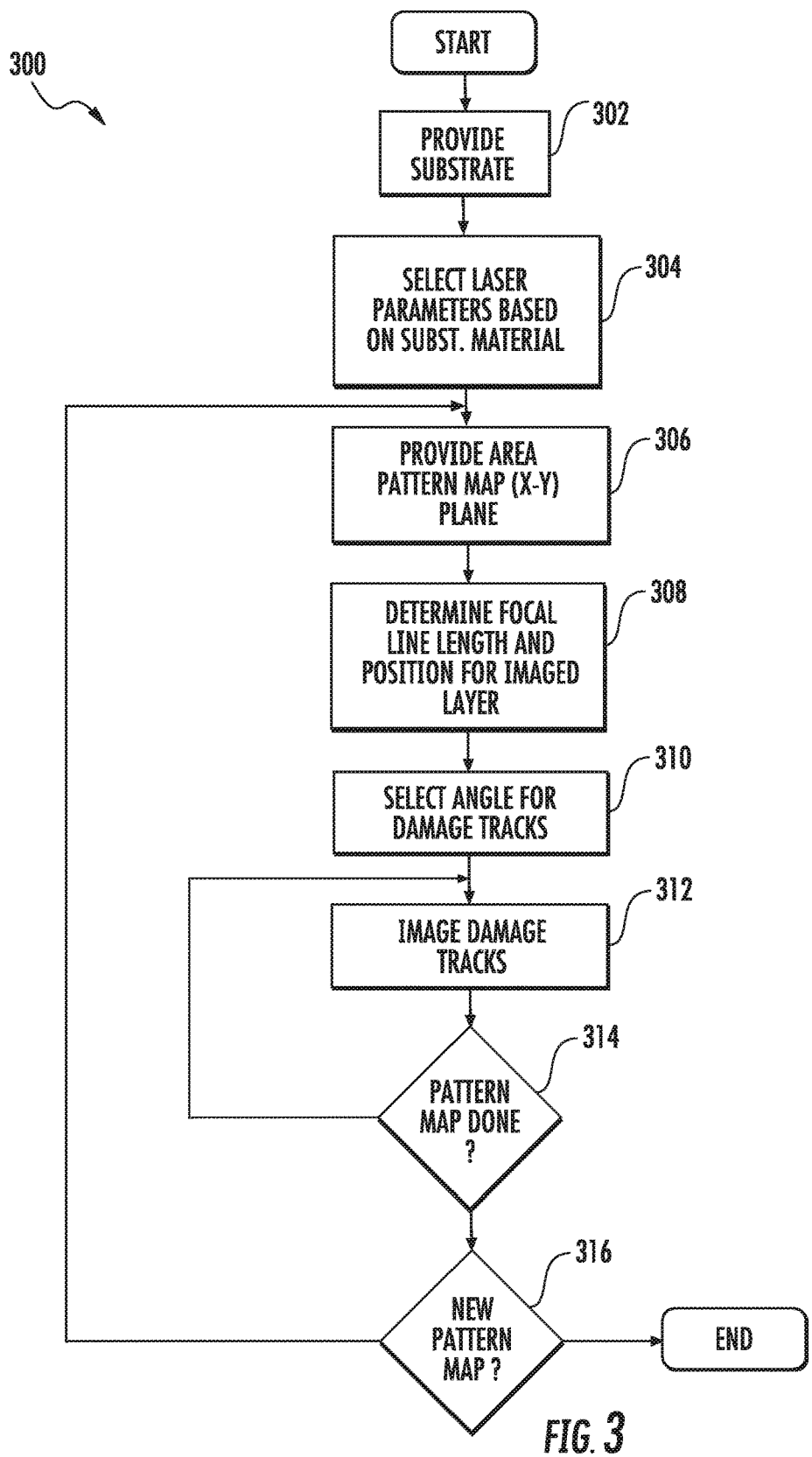
FIG. 3 is a flow chart illustrating a method for making an optical sheet in accordance with one embodiment.

Reference will now be made in detail to the present embodiments, examples of which are illustrated in the accompanying drawings. Whenever possible, the same reference numerals will be used throughout the drawings to refer to the same or like parts. One embodiment of the optical sheet with integral microlouvers is shown in FIG. 1, and is designated generally throughout by the reference numeral 10.

As embodied herein and depicted in FIGS. 1A and 1B, diagrammatic depictions of an assembly 1 for making an optical sheet 10 (which is also referred to herein as a transparent substrate) with integral microlouvers in accordance with one embodiment is disclosed. As described herein, the optical substrate 10 may be glass, fused silica, sapphire, a polymer, or any other suitable material. FIGS. 1A-1B show the optical substrate 10 disposed on a platform 30. Briefly, an imaging system 20 (which is also referred to herein as an imaging assembly) is employed to generate a focal line to provide laser induced damage tracks with a pulsed line focus laser beam under the direction of a controller 40. The substrate 10 is essentially transparent with respect to single photon absorption of the pulsed line focus laser beam when propagating through the substrate material 10. The imaging system 20 includes a laser light source 24 for providing a pulsed laser beam, and an optical system 22 for guiding the pulsed laser beam from the laser light source to the material and forming a line focus within the material. The movable platform 30 may be employed as a translation mechanism for positioning the substrate 10 with respect to the focal line formed by the optical system 22 (as described below other alternate embodiments of the invention are disclosed).

The formation of an extended linear region of damage, as is created by line focus optics and a short pulsed-laser, is important to the practical formation of the louvers. With traditional Gaussian optical beams, it is possible to create damage regions inside a transparent material. However, the length of the interaction region is can be short, governed by the diffraction of the beam. When Gaussian beams are focused to small enough spot sizes to generate sufficient intensities, they generally have Rayleigh (depth of focus) ranges~tens of microns. However, for Bessel beams, the length of interaction over which a small spot size is maintained is much longer, easily~millimeters. This means that in a single pass, the Bessel-like beam, or line focus, can modify a much longer section of glass than a standard Gaussian beam. For forming long thin louver structure, this makes processing speeds with Bessel-like beams multiple orders of magnitude faster than with typical Gaussian beams. It is also possible to form a long thin damage track through a process known as "filamentation". In this method, a very laser pulse is sent into a material, of sufficient intensity so that the optical Kerr effect takes place, where the refractive index of the material is locally modified by the high electric field strength of the laser pulse. This makes the beam self-focus, and can create beams that propagate in long thin channels through many millimeters of material. This process requires the power in the laser pulse to exceed a certain threshold, $P_{critical}$, which for glass is typically ~5 MW. Hence very short pulse (e.g. femtosecond) and high energy lasers are required for filamentation.

The use of line focus optics and Bessel-like beams with short pulse lasers may be a preferred method to fabricate internal louvers in the substrate. But it should be understood that above mentioned other methods can also be used to generate the long thin louvers inside glass, albeit with trade-offs in either increased system cost or decreased reliability (from very short pulse and high energy lasers) or overall processing time (with Gaussian beams and many focus passes).

Specifically, the control system 40 is typically configured as a highly automated apparatus that is substantially controlled by a computer-aided manufacturing program 42. In one embodiment, the program 42 generates an executable file that directs the relative motion between the platform 30 and the imaging assembly 20. FIG. 1A illustrates the relative movement between the imaging assembly 20 and the substrate 10 in the x-y plane. FIG. 1B is a side view that illustrates the relative movement between the imaging assembly and the substrate 10 in the z-direction and in the angular direction ($\theta$).

In one embodiment, apparatus 1 features a stationary imaging assembly 20; in this case, the platform 30 is configured to move beneath the imaging assembly 20. The present disclosure also contemplates the use of a hybrid apparatus 1 that incorporates both platform 30 movements as well as imaging assembly 20 movements. The platform 30 may be, for example, a programmable numerical control (CNC) apparatus. For example, platform 30 may be configured to move in one axial direction whereas the imaging assembly 20 moves in the remaining axes. The present disclosure also contemplates the use of a stationary platform 30 and an imaging assembly 20 that is configured to move in three-dimensional space over the substrate 10 as required by the program 42. One embodiment of the program 42 is shown at FIG. 3 and described in the related text. The program 42 can also be configured to control the laser parameters and the optical parameters of the imaging system 20.

The control apparatus 40 is configured to operate the imaging assembly 20 in order to precisely form a laser beam focal line at a precise location in three-dimensional space within the substrate 10. The imaging assembly 20 includes a pulsed laser 24 that operates in conjunction with an optical system 22. To be specific, the control unit 40 is configured to control the optical system 22 and the pulsed laser 24 so that a laser beam having predetermined laser characteristics traverses an optical beam path to generate an elongated laser-induced damage track 12-1 in the substrate 10. In particular, the imaging system 20, under the control of controller 40, generates a single laser pulse, or burst of pulses, of a pulsed line focus laser beam to interact with the substrate material 10. The laser beam is characterized by a focal line that generates an induced absorption within the substrate material so that a material modification is produced along the laser beam focal line within the material. This material modification is referred to herein as a laser-induced damage track, or damage track for short. The control system 40 may be implemented using a programmable numerical control (CNC) apparatus.

As noted briefly above, the wavelength of the laser 24 may be chosen such that the material of the substrate 10 is substantially transparent at the chosen wavelength (specifically for example: absorption<15% per mm of material depth=>$\gamma\ll1$/cm, where $\gamma$ is the Lambert-Beer absorption coefficient). The pulse duration of the laser 24 may be chosen such that no significant heat transport (heat diffusion) out of the zone of interaction can take place within the time of interaction (specifically for example: $\tau\ll d^2/\alpha$, where d is the focus diameter, $\tau$ is the laser pulse duration, and a is the heat diffusion constant of the material). The pulse energy of the laser 24 may be chosen such that the intensity in the zone of interaction, that is to say in the focal line, produces an induced absorption, which leads to the formation of a damage track corresponding to the focal line.

The polarization of the laser 24 may influence both the interaction at the surface (reflectivity) and the type of interaction within the material in the induced absorption. The induced absorption may take place by way of induced, free charge carriers (typically electrons), either after thermal excitation, or by way of multiphoton absorption and internal photoionization, or by way of direct field ionization (field strength of the light breaks electron bonding directly). The type of generation of the charge carriers can be assessed for example by way of the so-called Keldysh parameter, which however does not play any role for the application of the method. In the case of certain materials (for example birefringent materials) it may just be important that the further absorption/transmission of the laser light depends on the polarization, and consequently the polarization by way of suitable optics (phase plates) should be chosen by the user to be conducive for separating the respective material, for example simply in a heuristic way. Therefore, if the material is not optically isotropic, but for example birefringent, the propagation of the laser light in the material is also influenced by the polarization. Thus, the polarization and the orientation of the polarization vector may be chosen such that, as desired, there only forms one focal line and not two (ordinary and extraordinary rays). In the case of optically isotropic materials, this does not play any role.

Furthermore, the intensity should be chosen on the basis of the pulse duration, the pulse energy and the focal line diameter such that there is preferably no significant ablation or significant melting, but preferably only damage track formation, in the microstructure of the substrate. For typical materials such as glass or transparent crystals, this requirement can be satisfied most easily with pulsed lasers in the sub-nanosecond range, that is to say in particular with pulse durations of for example between about 0.1 ps and 100 ps, and preferably less than 15 ps.

In some embodiments, the average diameter $\delta$ of the laser beam focal line, that is to say the spot diameter, is between about 0.3 µm and about 5.0 µm, preferably between about 1.0 µm and about 3.0 µm, more preferably between about 0.4 µm and bout 4.0 µm, and even more preferably is about 2.0 µm, and/or in that the pulse duration $\tau$ of the laser 24 is chosen such that, within the time of interaction with the material of the substrate 10, the heat diffusion in the material is negligible, preferably no heat diffusion takes place, for which preferably $\tau$, $\delta$ and the heat diffusion constant $\alpha$ of the material of the substrate 10 are set according to $\tau << \delta^2/\alpha$ and/or preferably $\tau$ is chosen to be less than about 10 ns, preferably less than about 100 ps, and/or in that the pulse repetition rate of the laser 24 is between about 10 kHz and about 1000 kHz (e.g., about 100 kHz), and/or in that the laser 24 is operated as a single-pulse laser or as a burst-pulse laser, with energies per burst pulse between 40 uJ and 1000 uJ, and/or in that the average laser power, measured directly on the output side of the beam of the laser 24, is between about 10 watts and about 100 watts (e.g., between about 30 watts and about 50 watts).

In certain embodiments, the wavelength $\lambda$ of the laser 24 is chosen such that the material of the substrate 10 is transparent to this wavelength or is substantially transparent, the latter being understood as meaning that the decrease in intensity of the laser beam taking place along the direction of the beam in the material of the substrate 10 per millimeter of the depth of penetration is about 15% or less, the laser being, in particular for glasses or crystals that are transparent in the visible wavelength range as the substrate 10, preferably an Nd:YAG laser with a wavelength $\lambda$ of 1064 nm or a Yb:YAG laser with a wavelength $\lambda$ of 1030 nm, or, in particular for semiconductor substrates 10 that are transparent in the infrared wavelength range, preferably an Er:YAG laser with a wavelength $\lambda$ of between about 1.5 µm and about 1.8 µm.

Reference is made to U.S. Published Patent Application No. US20140199519, which is incorporated herein by reference as though fully set forth in its entirety, for a more detailed explanation of the imaging system 20 in general, and laser 24, in particular. Reference is also made to International Published Patent Application No WO2014/079570, which is incorporated herein by reference as though fully set forth in its entirety, for a more detailed explanation of the imaging system 20 in general, and laser 24, in particular.

As embodied herein and depicted in FIG. 2, a diagrammatic depiction of the exemplary embodiments of the optical system 22 shown in FIGS. 1A and 1B is disclosed. Specifically, the optical system 22 may include an optical element 22-1 positioned in the path of the laser beam 24-1. The optical element 22-1 features a non-spherical free surface and may be implemented as an axicon with a 5° cone angle, which is positioned perpendicularly to the direction of the beam and centered on the laser beam 24-1. The cone tip of the axicon in this case points counter to the direction of the beam. The distance of the plan-convex collimation lens 22-3 from the axicon 22-1 is denoted here by z1a, the distance of the focusing lens 22-2 from the collimation lens 22-3 is denoted by z1b and the distance of the focal line 2b produced from the focusing lens 22-2 is denoted by z2 (seen in each case in the direction of the beam). The annular transformation of the laser beam by the axicon 22-1 is provided here with the reference sign SR. The annular radiation SR that is formed by the axicon and incident upon the collimation lens 22-3 in a divergent manner and with the ring diameter dr, has the ring diameter dr remaining at least approximately constant along the distance z1b and is set to the desired ring width br at the location of the focusing lens 22-2. As a result, a very short focal line 2b is produced, so that the ring width br of about 4.0 mm at the location of the lens 22-3 is reduced by the focusing properties of the latter at the location of the lens 22-2 to about 0.5 mm.

A focal line length 2b of about 0.5 mm (or smaller) can be achieved with a typical beam diameter from the laser of about 2.0 mm, a focusing lens (22-2) of f=25 mm focal length and a collimation lens of f'=150 mm focal length. Furthermore, note that Z1a is substantially equal to Z1b (140 mm) and Z2 is substantially equal to about 15 mm.

As embodied herein and depicted in FIG. 3, a flow chart 300 illustrating a method for making an optical sheet 10 with integral microlouvers is disclosed. In step 302, a substrate 10 is selected for making the optical sheet 10. The optical substrate 10 may be glass, fused silica, sapphire, a polymer, or any suitable transparent optical substrate. The glass materials may include various glass substrates such as quartz, borosilicate, sapphire or soda-lime glass, sodium-containing glass, hardened glass or unhardened glass, of crystalline $Al_2O_3$, of $SiO_2 \cdot nH_2O$ (opal) or of a semiconductor material, in particular Si, GaAs, GaN, separating single- or multi-layered substrates, in particular glass-glass composites, glass-film composites, glass-film-glass composites or glass-air-glass composites, separating coated substrates, in particular metal-coated sapphire wafers, silicon wafers provided with metal or metal-oxide layers or substrates coated with ITO or AlZnO, and/or completely severing a single- or multi-layered substrate or severing one or more, but not all of the layers of a multi-layered substrate. See, e.g., FIGS. 4, 5, 24, and 25, etc. for substrate examples.

In step 304, the imaging system 20 parameters are selected in accordance with the selected material. As described above, some of these specifications (including ranges, if applicable) would include the laser wavelength, pulse width, spot size, pulse energy, scan speed and depth of focus for different material/glass compositions. As noted above, the "line-focus optics" (e.g. Gauss-Bessel or Bessel-like beams) used to create the louver structures are advantageous because they can form the elongated damage tracks (i.e., louver structures) in a single laser pass, as opposed to multiple passes that would be required using traditional laser beams. Moreover, since the combination of a short-pulse (<100 ps) laser with Bessel beams form focal lines that involve no significant ablation or melting, they are preferably employed herein so that damage tracks are only formed in the microstructure of the substrate 10.

In step 306, the area pattern map that is to be formed in substrate 10 is provided to the controller 40. As disclosed herein, the pattern map specifies micro louver viewing angles, the size and position of text or other such alphanumeric indicia, art work, logos, etc. See, e.g., FIGS. 12-20 for examples of such maps. In step 308, the focal length and the position of the focal length within the substrate are also provided to the controller 40. See, e.g., FIGS. 9-11, and 22. The determination of the x-y map, the focal line length and other laser parameters described herein, specifies the formation and the positioning of the damage tracks within substrate 10. In step 310, the angle θ for damage tracks is selected. If the damage tracks are designed to be normal to the major surface 10-1 of the substrate 10, then angle θ of the imaging system 20 relative to substrate 10 selected in step 310 should be zero. FIG. 23 provides an example embodiment wherein the angle is something other than zero.

Figure 11:
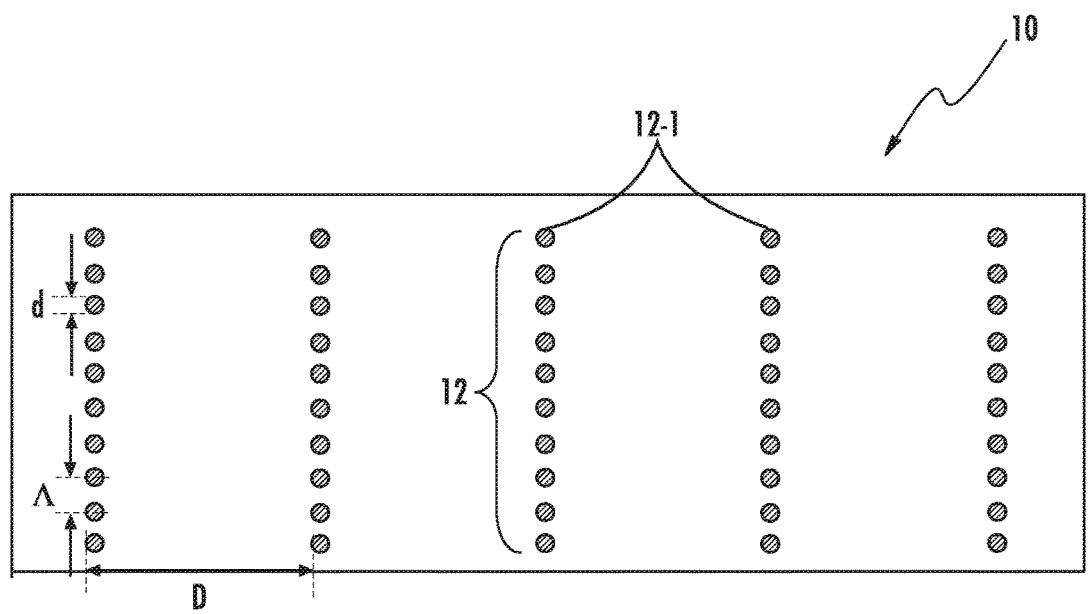
FIG. 11 is a transverse sectional view of an optical sheet with integral microlouvers in accordance with an embodiment.

In steps 312-314, the imaging system 20 laser-induces damage tracks within substrate 10 in accordance with the predetermined plan specified in steps 302-310. As shown in FIG. 11, the predetermined plan may call for multiple layers of tracks, in which case, decision diamond 316 would redirect the process flow to step 306. In such a case, it is generally preferred to form the lowest layer first (the layer furthest from the optics), and then progress to layers above that, so that pre-existing damage tracks above the desired layer do not block the rays of the high numerical aperture beam from forming a line focus. Once the last layer is formed in substrate 10, the process may be terminated (step 318). Alternatively, the fabricated substrate can be strengthened in subsequent steps using thermal or chemical means.

Figure 4:
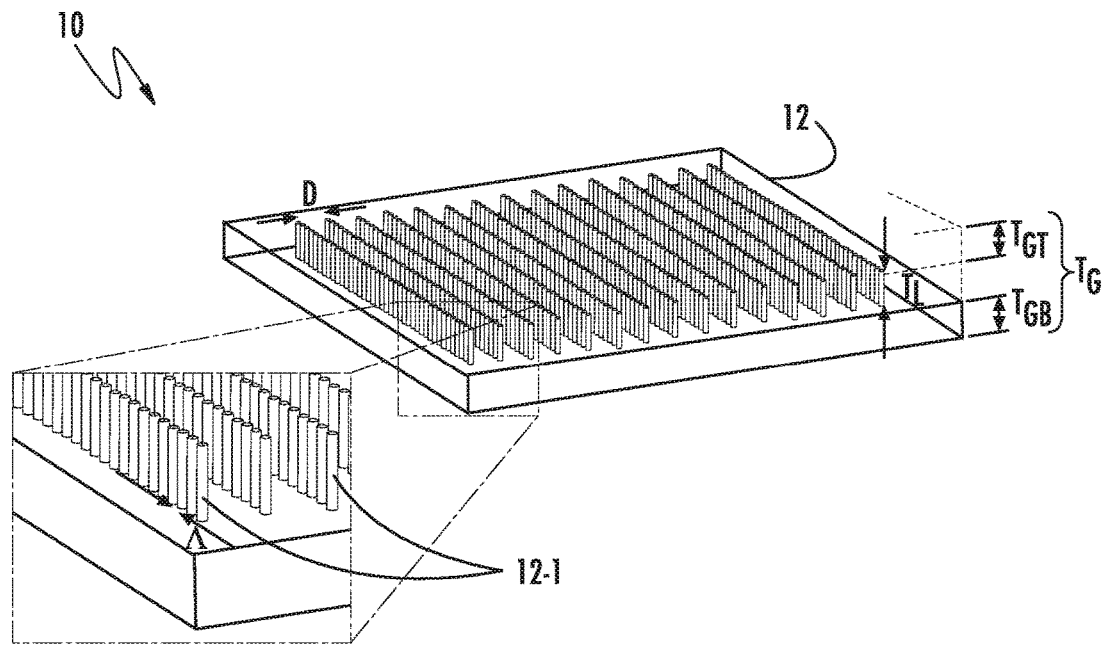
FIG. 4 is an isometric view of an optical sheet with integral microlouvers in accordance with one embodiment.

As embodied herein and depicted in FIG. 4, an isometric view of an optical sheet 10 with integral microlouvers 12 is disclosed. The optical sheet 10 is implemented, for example, by a glass sheet that includes closely spaced damage tracks 12-1 that produce an angular dependent haze. Thus, the optical sheet 10 provides angular viewing selectivity in a single sheet of glass without the need for additional layers, films or coatings.

The integral microlouvers 12 are implemented by multiple parallel transverse rows of damage tracks 12-1 that are periodically spaced and disposed in at least one vertical layer. The microlouvers 12, having depth $T_L$, are disposed in the interior of the substrate 10 between a top layer of undamaged material having depth $T_{GT}$ and a bottom layer of undamaged substrate material having depth $T_{GB}$. Thus, the glass thickness $T_G=T_{GT}+T_L+T_{GB}$. The length of the microlouvers $T_L$ substantially corresponds to the focal line length generated by the imaging system 20 (described above). The depth of the top and bottom layers, where the glass is unmodified by the damage tracks, is selected to prevent the cracks from propagating to the surfaces of the glass, and to provide the optical sheet 10 with enough structural integrity to resist any shear forces. Ensuring that the damage tracks do not extend all the way to the glass surface is particularly important, as when a crack reaches the glass surface, it creates a path for water or humidity ingress, which rapidly promotes crack growth and will cause failure of the part. In practice, keeping the distances $T_{GT}$ and $T_{GB}$>50 microns, and more preferably >100 microns has been found to be sufficient. In the case of thin glass, e.g. <1 mm, ensuring this stand-off distance can require precise control of the system focus and the energy density distribution within the laser line focus. However, in the case of thicker glass, e.g. >3 mm, which is commonly used in the architectural applications, larger stand-off distances may be employed (e.g. 250 um or more) without significantly sacrificing optical performance.

The rows of microlouvers 12 are separated by a row spacing D, and the damage tracks 12-1 are separated by a pitch Λ. Additionally, the individual damage tracks 12-1 have a diameter d. As described herein the row spacing D, pitch Λ and damage track depth $T_L$ substantially determines the viewing angle of the optical sheet 10. The region of substrate 10 that is laser processed can be selected to include all or a small part of the substrate 10. In one embodiment, for example, the microlouvers feature a row spacing D of about 50 to about 2000 microns, a pitch Λ of between about 3.0 microns and about 50 microns and a damage track depth $T_L$ of about 0.2 mm to about 10 mm. The individual damage tracks typically have a diameter d of between about 0.5 micron and about 5.0 microns. As noted previously, the diameter d and the damage track depth $T_L$ is determined by the spot diameter and the line-focus parameters of the imaging system 20. Of course, the present disclosure should not be construed as being limited to the above stated values. These values and ranges are merely exemplary.

Figure 5:
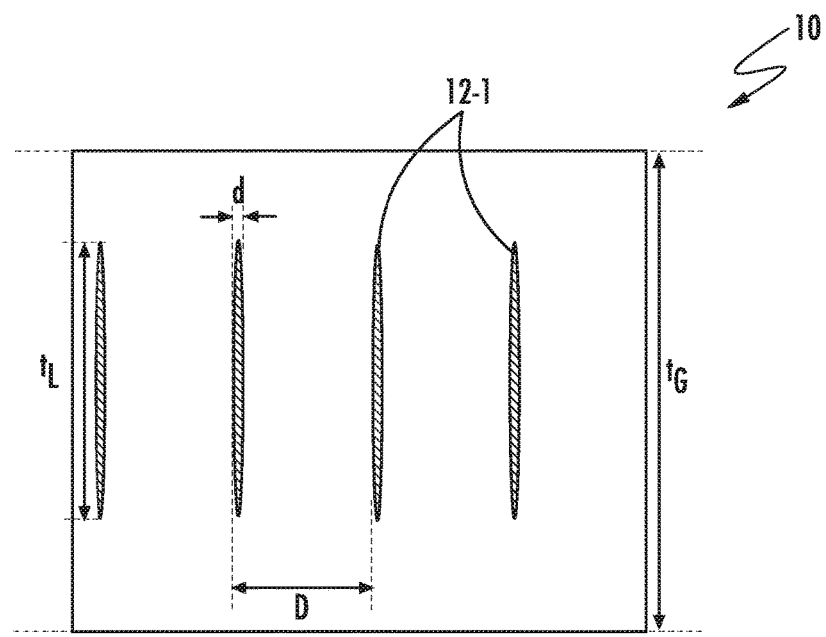
FIG. 5 is a cross-sectional view of the optical sheet depicted in FIG. 4.

Referring to FIG. 5, a cross-sectional view of the optical sheet 10 depicted in FIG. 4 is disclosed. This view clearly shows the row spacing D, the diameter d and the damage track depth $T_L$ from a different vantage point.

Figure 6:
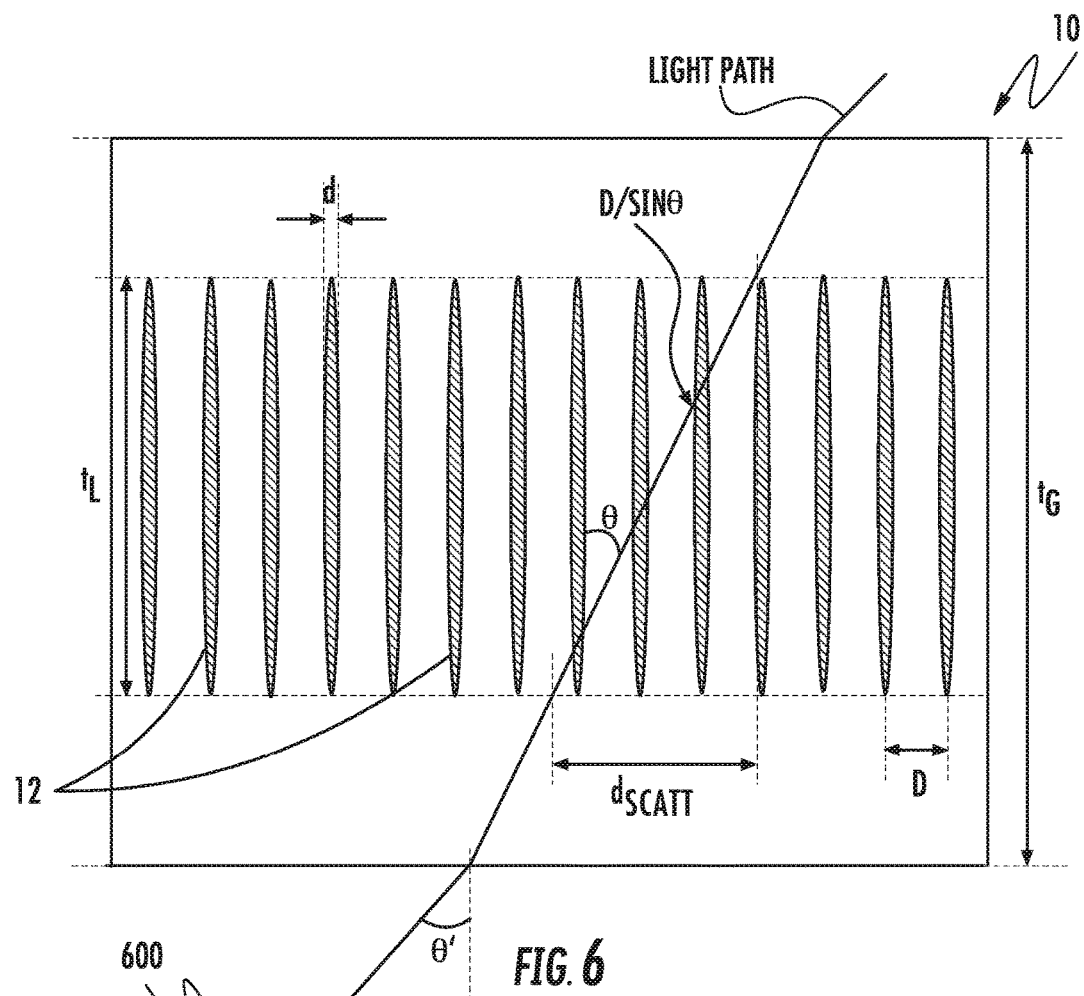
FIG. 6 is a cross-sectional view of an optical sheet with integral microlouvers illustrating angular scattering parameters of the optical sheet.

Referring to FIG. 6, a cross-sectional view of an optical sheet 10 that illustrates the angular scattering parameters of the microlouvers 12 is disclosed. As before, D refers to the louver 12 row spacing, d is the diameter of the damage track 12-1 and $T_L$ is the depth of the damage tracks 12-1. The incident angle of the light path in air, or the viewing angle, is θ'; due to the effects of refraction, the angle of the light path in the substrate 10 relative to a microlouver 12 is θ. Moreover, the length of the light path through each microlouver 12 is d/sin θ. The light scattering properties of the optical sheet 10 are somewhat counter-intuitive in that light scattering does not increase as θ' increases. One might be tempted to assume that since light must pass through two or more louvers as θ' increases, the incident light would be increasingly scattered in a linear manner. However, this result was not observed in experimental samples. In certain optical sheet samples, the "haze" from scattering appeared to be almost constant as a function of viewing angle.

Figure 7:
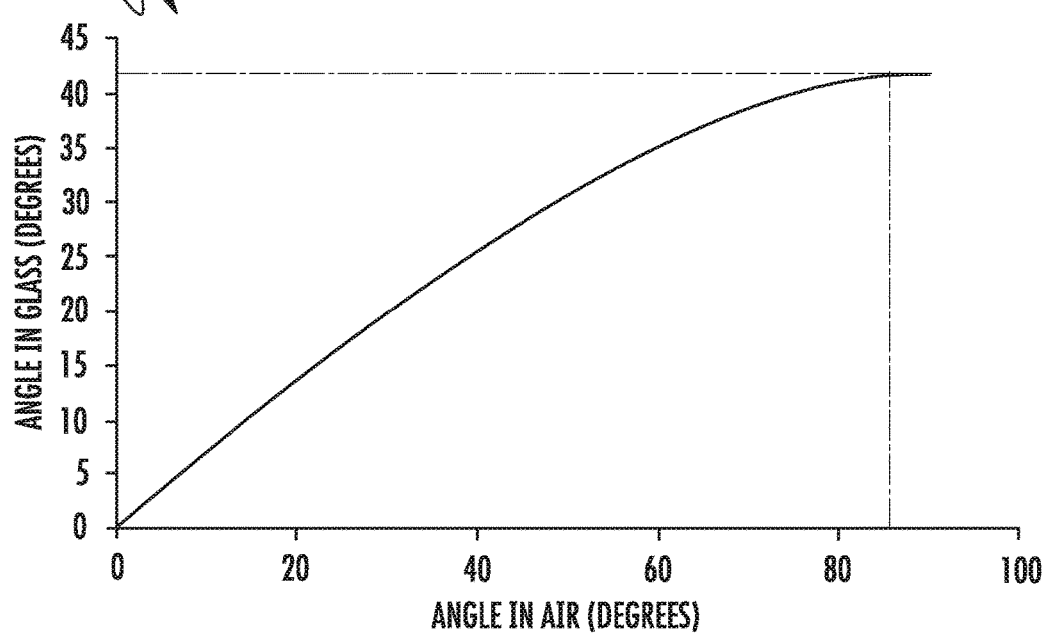
FIG. 7 is a chart illustrating the light scattering properties of the optical sheet depicted in FIG. 5.

In reference to FIG. 7, a chart 600 illustrating the light scattering properties of the optical sheet is disclosed. These properties are specified using the relationships identified in FIG. 6. As an initial point, the angle in glass (θ) is related to the angle (θ') in air by Snell's law of refraction:

$$n \sin θ - \sin θ' \qquad (1)$$

Where n is the refractive index. The calculation assumes that the louver 12 can be represented by a continuous thin slab of damage of depth $T_L$ and diameter d. The total path through the region of the glass is:

$$d_{scatt} = t_L \tan^{-1} θ \qquad (2)$$

Where $t_L$ is the depth of the louver or damage track. The number of louvers crossed in the light path length $d_{scatt}$ is an integer value:

$$n_{scatt} = int\left[\frac{d_{scatt}}{D}\right] \qquad (3)$$

Where, as before, D is the row spacing of the microlouvers 12. As the plot of FIG. 7 shows, as the viewing angle θ' increases, the angle θ in the substrate 10 levels off and becomes substantially constant (≈42°).

Figure 8:
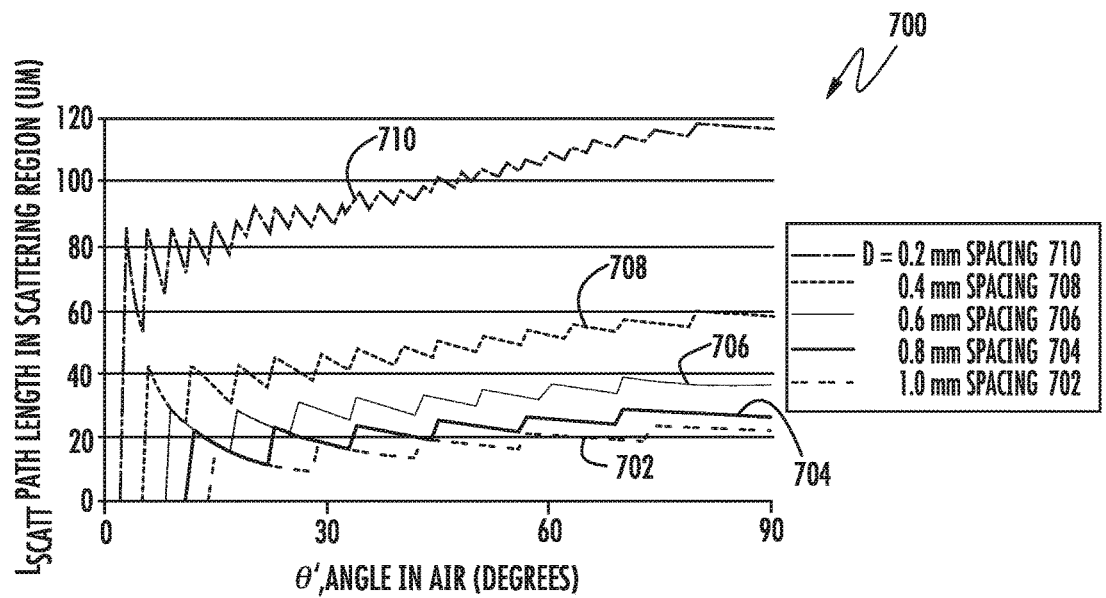
FIG. 8 is a chart illustrating light scattering as a function of microlouver spacing within the optical sheet depicted in FIG. 5.

In reference to FIG. 8, a chart 700 illustrating light scattering as a function of row spacing D of microlouvers 12 is disclosed. The total scattering path length is calculated as follows: the number of louvers 12 crossed by the light path is determined. This number is then multiplied by the path length of the individual scattering louvers 12.

FIG. 8 provides five louver spacings that range between 0.2 mm and 1.0 mm. In all cases, the calculated scattering length (and presumably the perceived haze) increases in a step-wise fashion clearly revealing the competing mechanisms of viewing angle and row spacing D of microlouvers 12. While the scattering length increases with an increase in viewing angle, it does not increase as rapidly as one might expect. This is especially true for the wider louver spacings (0.6 mm-1.0 mm). In experimentally produced optical sheet samples, the step-wise scattering is not easily observed, but the increase in haze is generally in line with the predictions of Eq. 4.

$$L_{scatt} = n_{scatt}(d/\sin\theta) \quad (4)$$

While scattering from louver structures is not as simple as one might expect, the model presented herein does capture the key parameters that drive light scattering in the optical sheet 10. Row spacing D of microlouvers 12, for example, is a key driver; when the microlouvers 12 are spaced apart (e.g., 0.6 mm-1.0 mm or greater), the scattering length is relatively constant with respect to the viewing angle $\theta'$. Once the row spacing D of microlouvers 12 drops below about 0.4 mm, the rate of the scattering path increase as a function of viewing angle $\theta'$ is much greater vis á vis the larger spacings.

Figure 9:
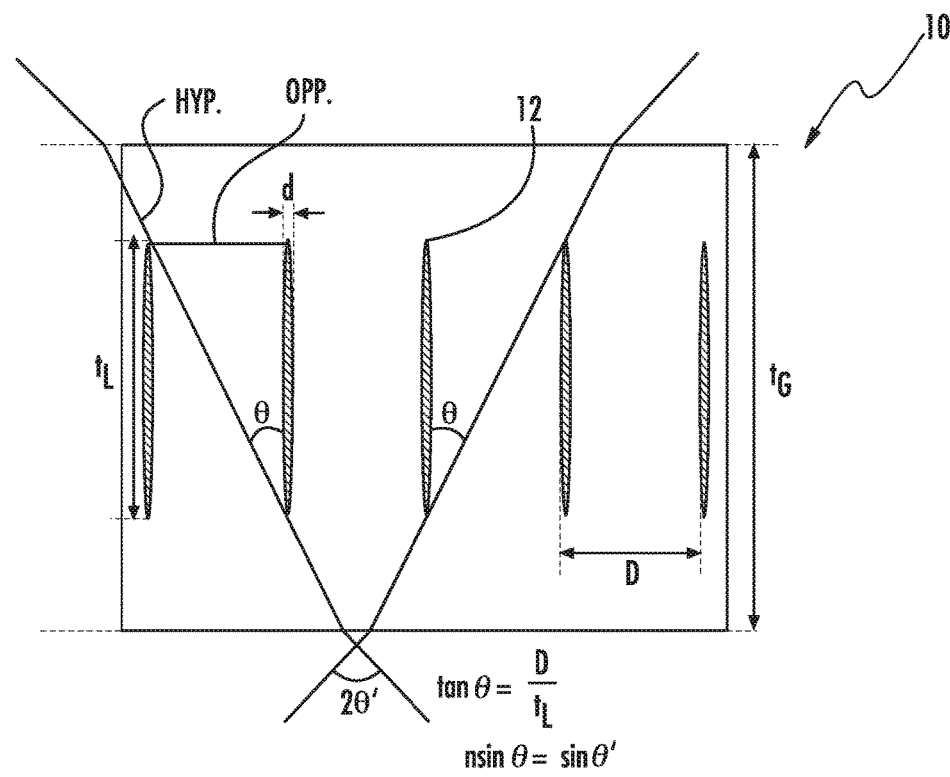
FIG. 9 is a cross-sectional view of an optical sheet illustrating the angular selectivity of the optical sheet in accordance with one embodiment.

As embodied herein and depicted in FIG. 9, a cross-sectional view of an optical sheet 10 illustrating the angular selectivity of the microlouvers 12 is disclosed. The viewing angle, or viewing cone, is defined as being equal to two times the angle in the air, or is $2\theta'$. If an observer is within the viewing cone $2\theta'$, he will be able to see through the substrate 10. If the observer is outside the viewing cone $2\theta'$, he will be unable to see through the substrate 10. Stated differently, if a beam of light is directed into the substrate 10 from within the viewing cone $2\theta'$, it will be refracted (See Snell's law) but not scattered. If a beam of light is directed into the substrate 10 from outside the viewing cone $2\theta'$, it will be refracted and scattered. As before, the relationship between the angle $\theta$ in the glass and the angle $\theta'$ in the air is given by Snell's law.

The angle $\theta$ in the glass is defined by forming a triangle, wherein the triangle's hypotenuse (Hyp.) touches the bottom of one microlouver 12 and the top of an adjacent microlouver 12 such that the opposite side of the triangle (Opp.) equals the row spacing D of the microlouvers 12 and the adjacent side of the triangle is defined by the depth $T_L$ of the damage track 12-1. The angle $\theta$ in the glass, and hence the viewing angle, is determined by the relationship:

$$\tan\theta = \text{opp}/\text{adj.} = D/t_L \quad (5)$$

From an intuitive standpoint, when $D=t_L$, the angle $\theta$ in the glass equals 45°. In FIG. 9, the row spacing D is much smaller than the depth $T_L$ of the damage tracks 12-1 and thus the angle $\theta$ in the glass will be less than 45°. More importantly, the above relationships show how designers can adjust the angle $\theta$ in the glass by varying either the row spacing D of the microlouvers 12, the depth $T_L$ of the damage track lengths 12-1, or both, to achieve the desired viewing cone $2\theta'$.

Figure 10:
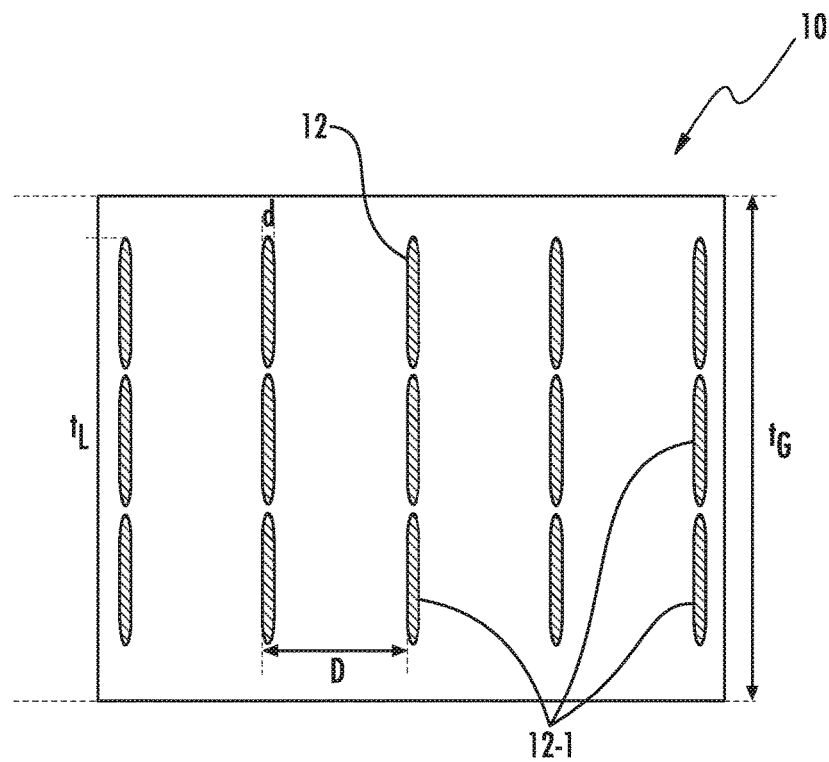
FIG. 10 is a cross-sectional view of an optical sheet with stacked integral microlouvers in accordance with another embodiment.

Referring to FIG. 10, a cross-sectional view of an optical sheet 10 with integral microlouvers 12 in accordance with another embodiment is disclosed. In this embodiment, the depth $T_L$ of the damage tracks 12-1 is increased by stacking three layers of damage tracks 12-1 one on top of the other. Intuitively speaking, the ratio of D over $t_L$—i.e., $\tan\theta$—will be smaller by a factor of three vis á vis FIG. 9; and therefore, the viewing cone $2\theta'$ will also be much smaller.

Referring to FIG. 11, a transverse sectional view of an optical sheet 10 with integral damage tracks 12-1 (forming microlouvers 12) is disclosed. In this view, the section is taken through the microlouvers 12 to illustrate the relationship between the row spacing D of the microlouvers 12, the diameter d of the damage tracks 12-1 and the pitch Λ of the damage tracks 12-1. This view may be thought of as being similar to FIG. 9, but taken through a section of the plane.

Figure 12:
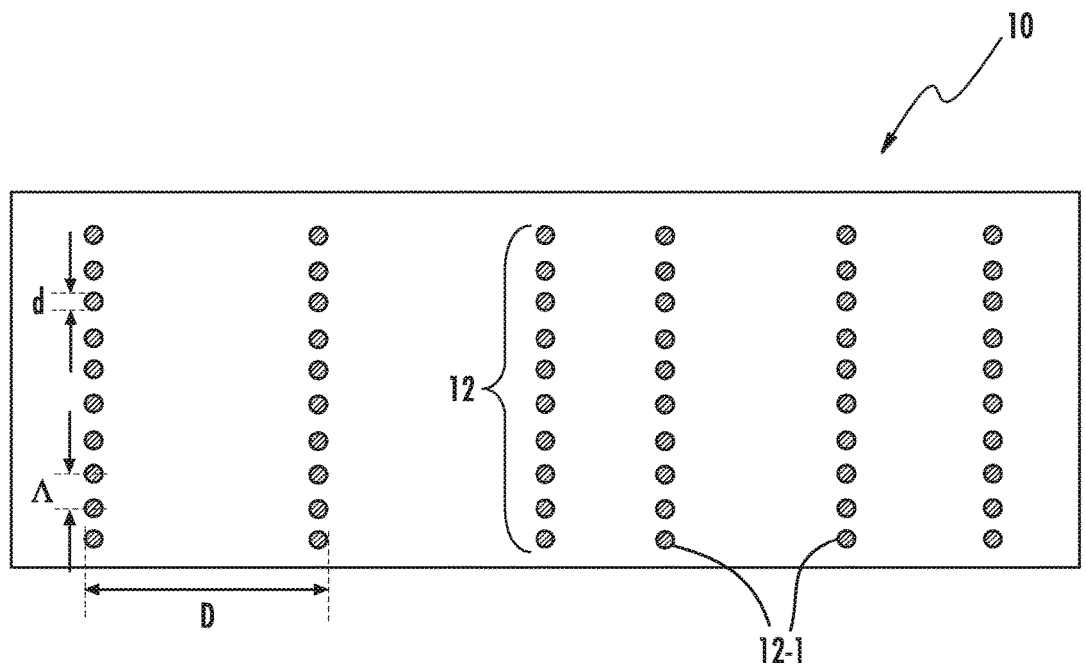
FIG. 12 is a transverse sectional view of an optical sheet with integral microlouvers in accordance with another embodiment.

Referring to FIG. 12, another transverse sectional view of an optical sheet 10 with integral damage tracks 12-1 (forming microlouvers 12) is disclosed. This drawing illustrates the design possibility of using different row spacing D of the microlouvers 12 in different locations in the substrate 10. This may be useful, for example, when the substrate 10 includes alphanumeric characters. Non-periodic row spacing D avoids the aliasing of text or features on a display.

Figure 13:
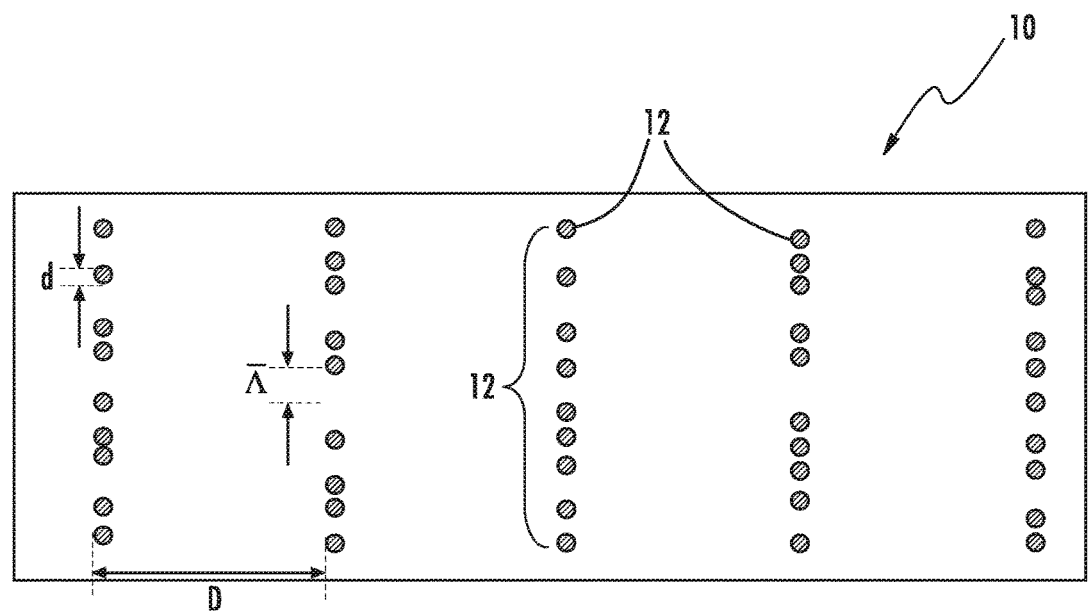
FIG. 13 is a transverse sectional view of an optical sheet with integral microlouvers in accordance with another embodiment.

Referring to FIG. 13, another transverse sectional view of an optical sheet 10 with integral damage tracks 12-1 (forming microlouvers 12) is disclosed. In this embodiment, the row spacing D of the microlouvers 12 is uniform throughout. However, the pitches Λ of the damage tracks 12-1 are varied. Non-periodic pitch Λ of damage tracks 12-1 can be used to avoid coherent diffraction effects (i.e., like a grating).

Figure 14:
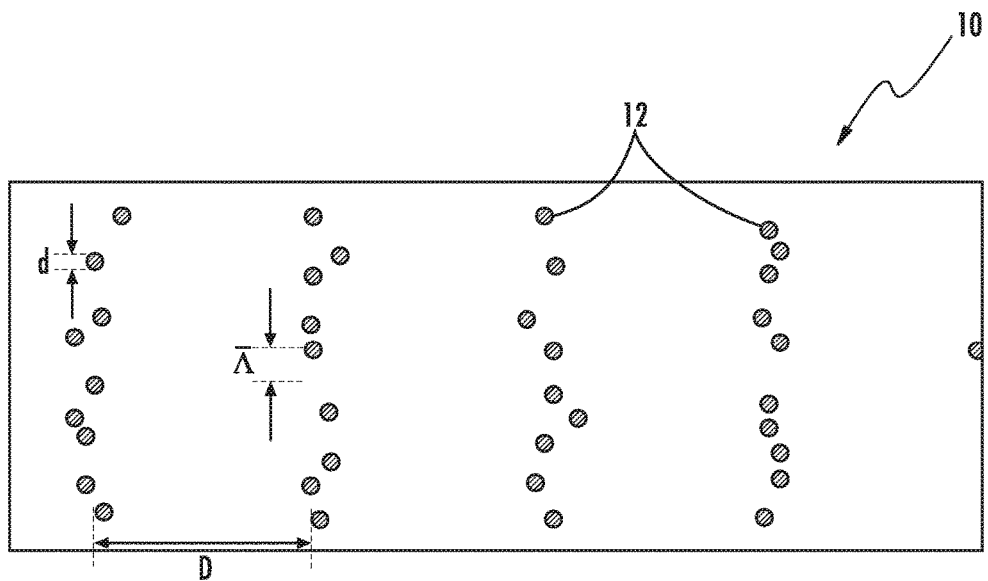
FIG. 14 is a transverse sectional view of an optical sheet with integral microlouvers in accordance with another embodiment.

Referring to FIG. 14, another transverse sectional view of an optical sheet 10 with integral damage tracks 12-1 (forming microlouvers 12) is disclosed. In this embodiment, both the row spacing D of the microlouvers 12 and the pitch Λ of the damage tracks 12-1 are implemented using a pseudo-random pattern. Cumulatively, each parameter (D, Λ) has a mean value. Random or non-periodic patterning without well-defined rows can be employed to avoid aliasing effects, in which periodic variations in the pattern could be perceived by a viewer as undesirable spatial variability in the light scattering or transmission.

Figure 15:
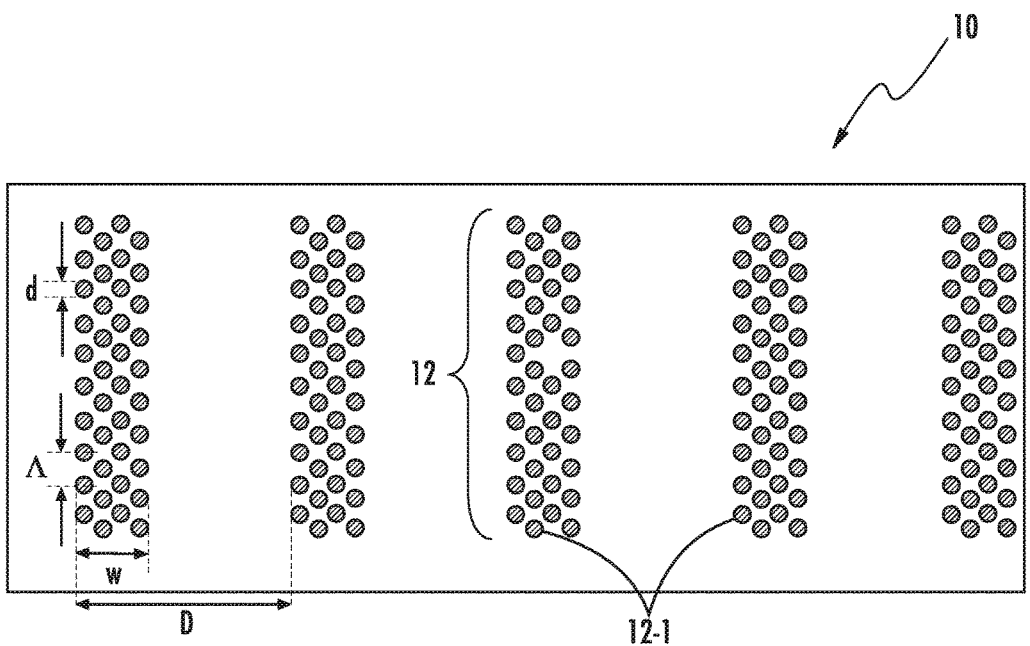
FIG. 15 is a transverse sectional view of an optical sheet with integral microlouvers in accordance with another embodiment.

Referring to FIG. 15, another transverse sectional view of an optical sheet 10 with integral damage tracks 12-1 (forming microlouvers 12) is disclosed. In this embodiment, each microlouver 12 has a width W that is formed by laying down multiple closely spaced rows of damage tracks 12-1. The pitches Λ of the adjacent rows of damage tracks 12-1 are offset. Clusters of rows of damage tracks 12-1 form higher scattering features that increase the haze (scattering). Here, the layers of microlouvers 12 are disposed at various angles to each other in order to provide angular anisotropy in various directions and to avoid aliasing of text or features on a display. Layers of microlouvers 12 with offsets can also be used to avoid "waveguiding."

Figure 16:
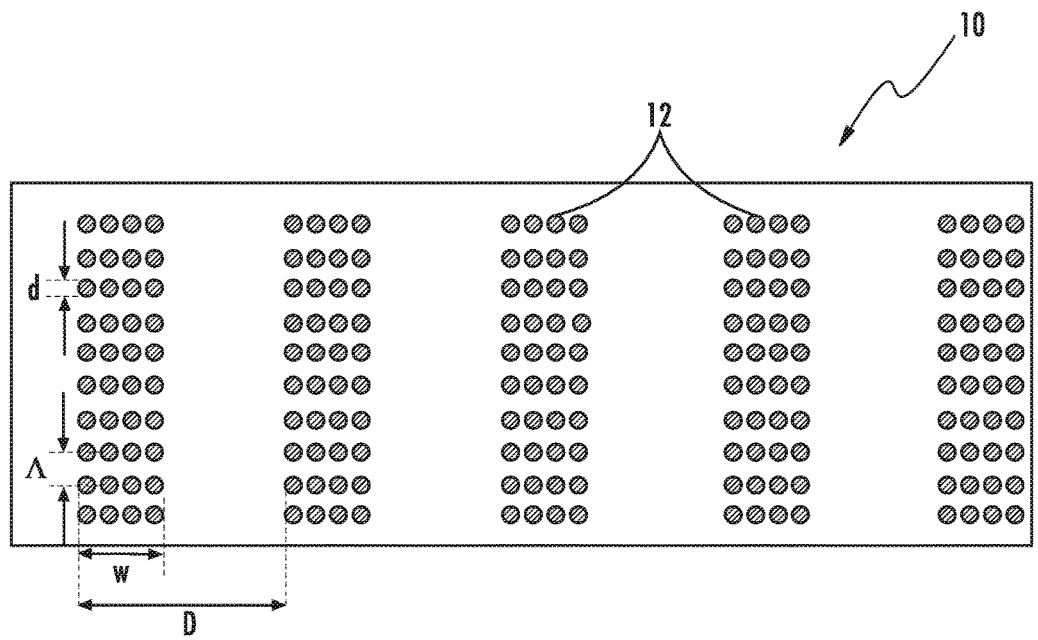
FIG. 16 is a transverse sectional view of an optical sheet with integral microlouvers in accordance with another embodiment.

Referring to FIG. 16, another transverse sectional view of an optical sheet 10 with integral damage tracks 12-1 (forming microlouvers 12) is disclosed. In this embodiment, each microlouver 12 has a width W that is formed by laying down multiple closely spaced rows of damage tracks 12-1. The pitches of the adjacent rows of damage tracks 12-1 are aligned (not offset). Again, clusters, or multiple layers of rows of damage tracks 12-1 form higher scattering features that increase the haze.

Figure 17:
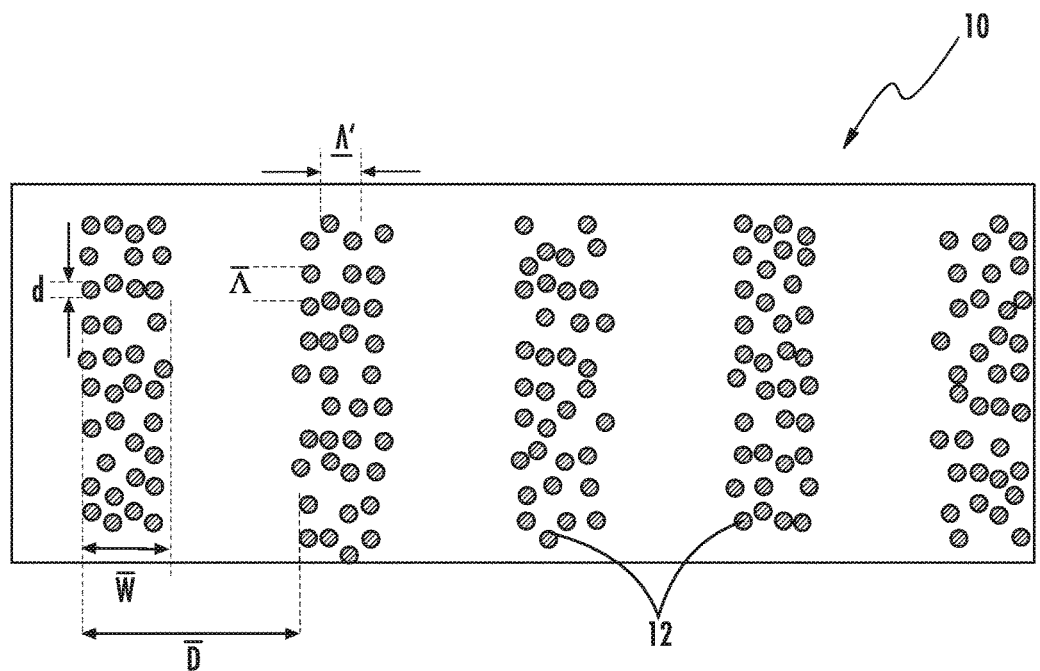
FIG. 17 is a transverse sectional view of an optical sheet with integral microlouvers in accordance with another embodiment.

Referring to FIG. 17, another transverse sectional view of an optical sheet 10 with integral damage tracks 12-1 (forming microlouvers 12) is disclosed. In this embodiment, each micro louver 12 has an average width $\overline{W}$ that is formed by laying down multiple closely spaced rows of damage tracks 12-1. Here, both the horizontal pitches Λ' and the vertical pitches Λ are randomized to create a meandering row pattern. The layers of microlouvers 12 disposed at various angles to each other in FIG. 17 may also represent the superimposed images or text that may be formed in the glass substrate 10 in accordance with embodiments of the present disclosure. Again, the layers of microlouvers 12 are disposed at various angles to each other in order to provide angular anisotropy in various directions and to avoid aliasing of text or features on a display. Layers of microlouvers 12 with offsets can also be used to avoid "waveguiding."

Figure 18:
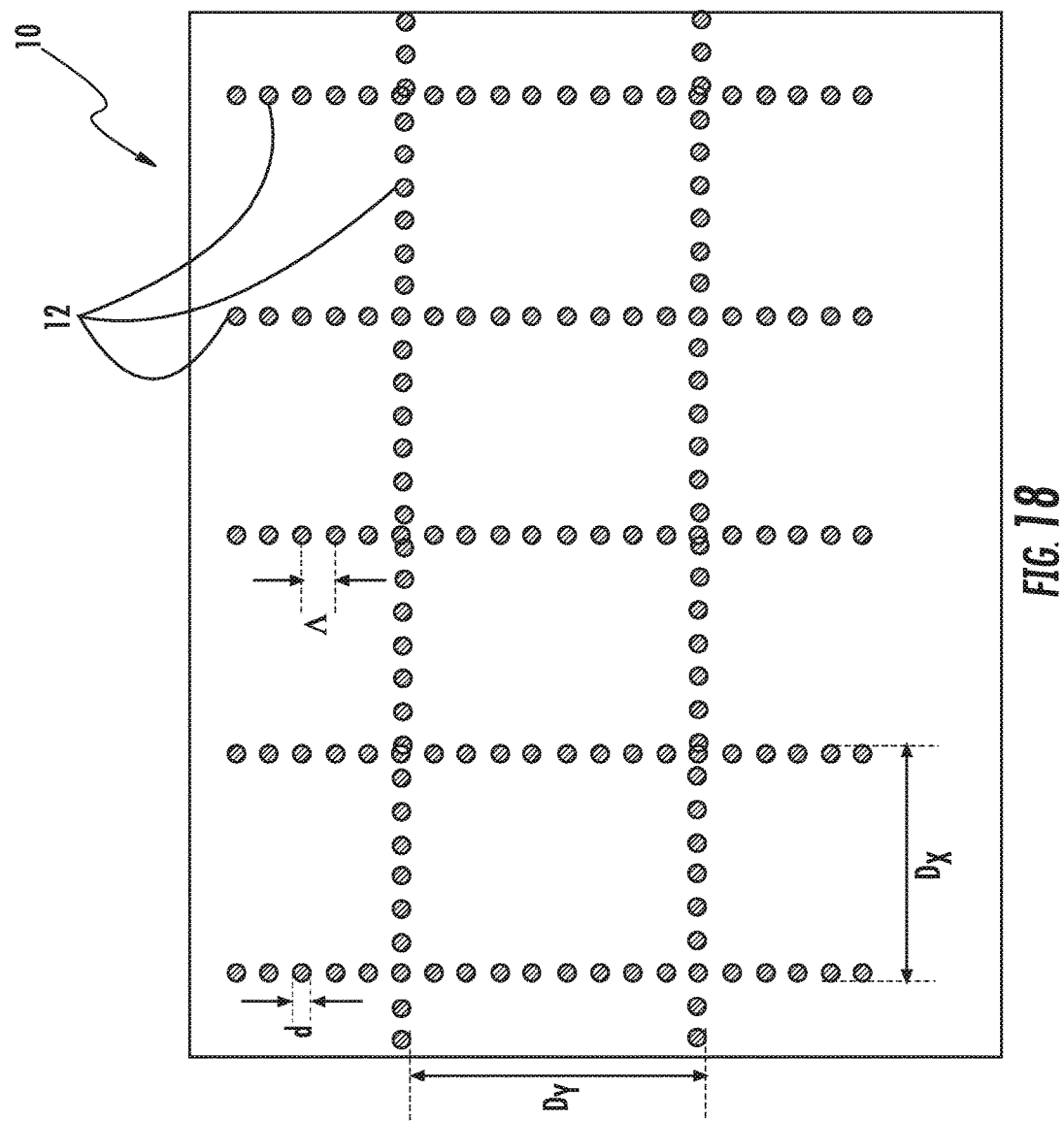
FIG. 18 is a transverse sectional view of an optical sheet with integral microlouvers in accordance with another embodiment.

Referring to FIG. 18, another transverse sectional view of an optical sheet 10 with integral damage tracks 12-1 (forming microlouvers 12) is disclosed. In this embodiment, the damage tracks 12-1 are laid out to create a grid pattern with a horizontal row spacing $D_x$ and a vertical row spacing $D_y$. This embodiment creates viewing angles in both axes such that the viewer must be "correctly" positioned both horizontally and vertically to see through the optical sheet 10. Stated differently, embodiments of the present disclosure may be used to provide selective transmission (for both vertical and horizontal angles) of light depending on the observation direction of the viewer.

Figure 19:
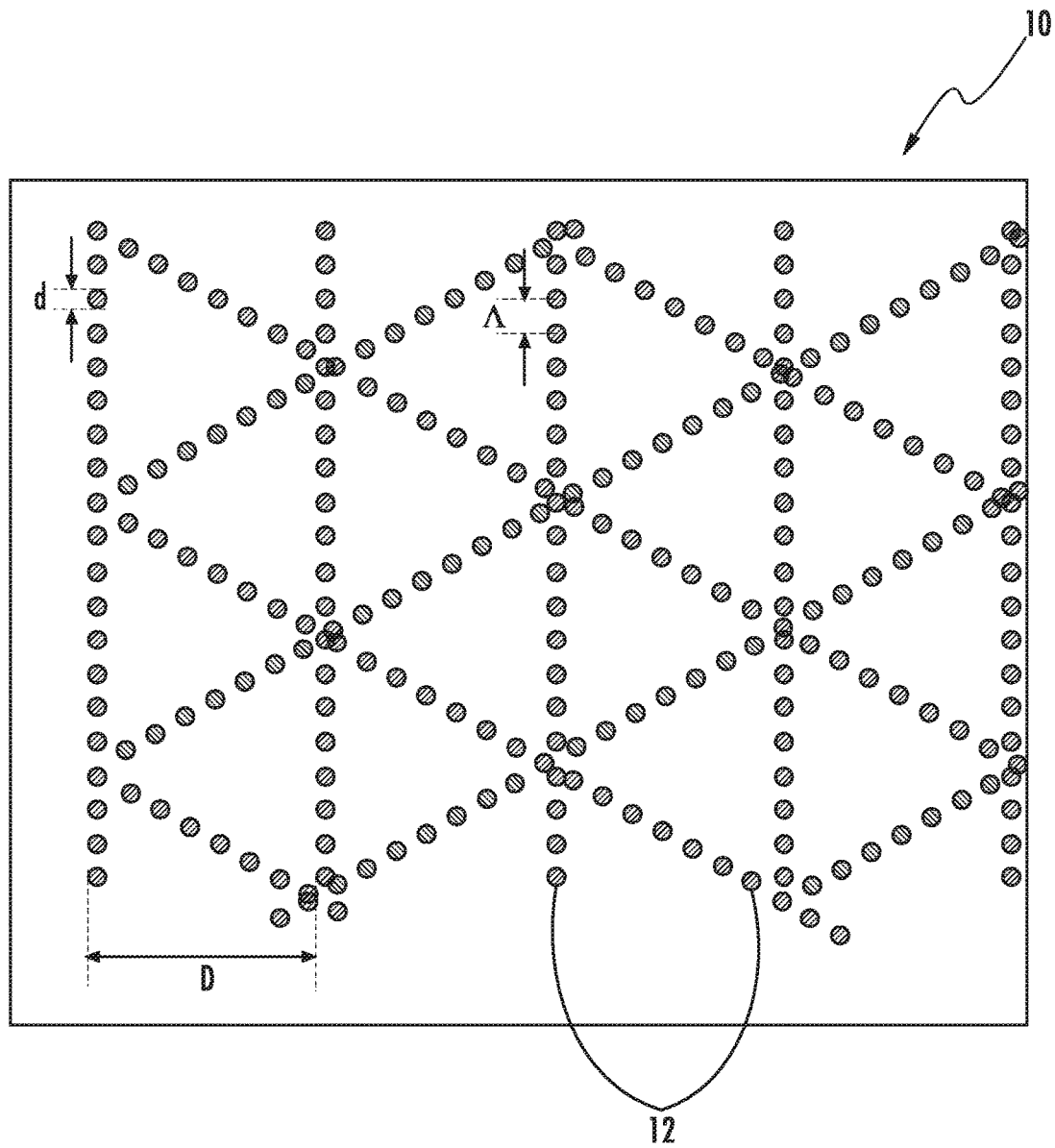
FIG. 19 is a transverse sectional view of an optical sheet with integral microlouvers in accordance with another embodiment.

Referring to FIG. 19, another transverse sectional view of an optical sheet 10 with integral damage tracks 12-1 (forming microlouvers 12) is disclosed. In this embodiment, the damage tracks 12-1 are laid out to create vertical rows of damage tracks 12-1 that are superimposed over a diagonal grid pattern of damage tracks 12-1, the vertical rows of damage tracks 12-1 forming micro louvers 12 having row spacing D. This embodiment creates multiple viewing angles and restricts the viewing angle to triangular openings. As before, embodiments of the present disclosure may be used to provide selective transmission of light depending on the observation direction of the viewer.

Figure 20A:
FIGS. 20A and 20B are front views of an optical sheet with integral microlouvers implementing human readable indicia in accordance with another embodiment.
Figure 20B:
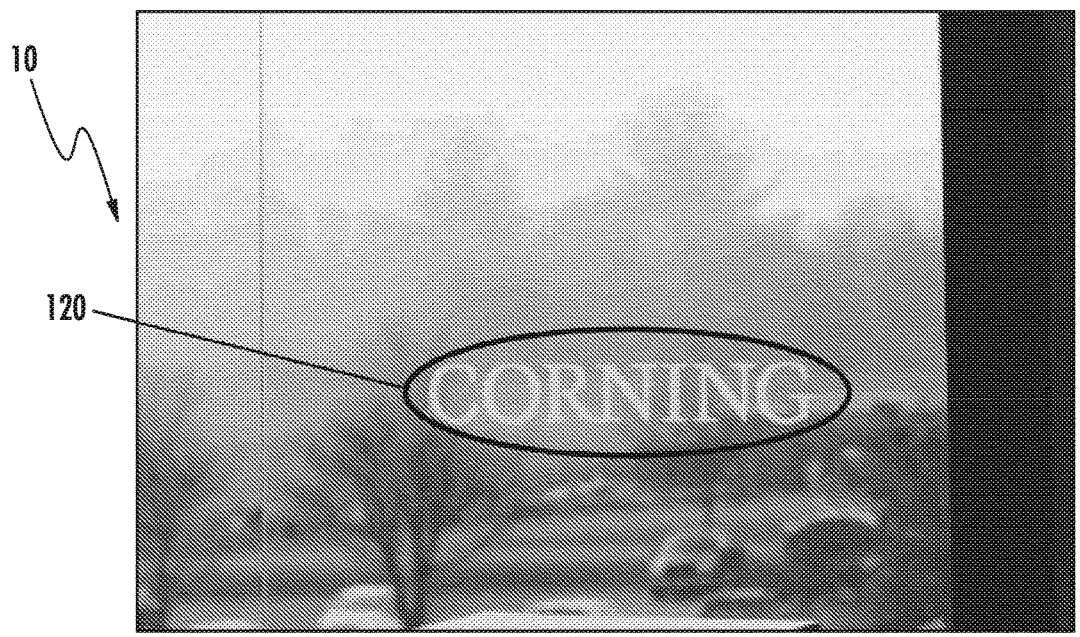

Referring to FIGS. 20A and 20B, front plan views of an optical sheet 10 with integral microlouvers implementing human readable indicia 120 are disclosed. In FIG. 20A, the vantage point is substantially within the viewing angle and so that the logo is barely visible. In FIG. 20B, the vantage point is substantially outside the viewing angle so that the logo can be clearly seen.

Those skilled in the art will appreciate that embodiments of the present disclosure may be employed to form alphanumeric characters, artwork, images or other such indicia. Visual features such as these are well-suited for providing advertising sheets, privacy screens, architectural glass, automotive glass, etc. As another example of the versatility of embodiments of the present disclosure, the visual features described above may also be employed to provide anti-counterfeiting indicia for use in products having glass components.

In this example, the logo was created by the method as disclosed herein (See FIG. 3 and the related text) wherein the pattern map is created by a macro-photograph of the logo. The thickness $T_G$ of the glass substrate 10 was approximately 5.75 mm. The row spacing D of the microlouvers 12 was approximately 700 μm, the damage track depth $T_L$ was about 1.0 mm, and the damage track pitch Λ was about 5.0 μm. Four layers of damage tracks 12-1 were employed to provide a total louver depth $T_L$ of about 4× $T_L$ or about 4.0 mm (or 4.0×1.0 mm).

Figure 21:
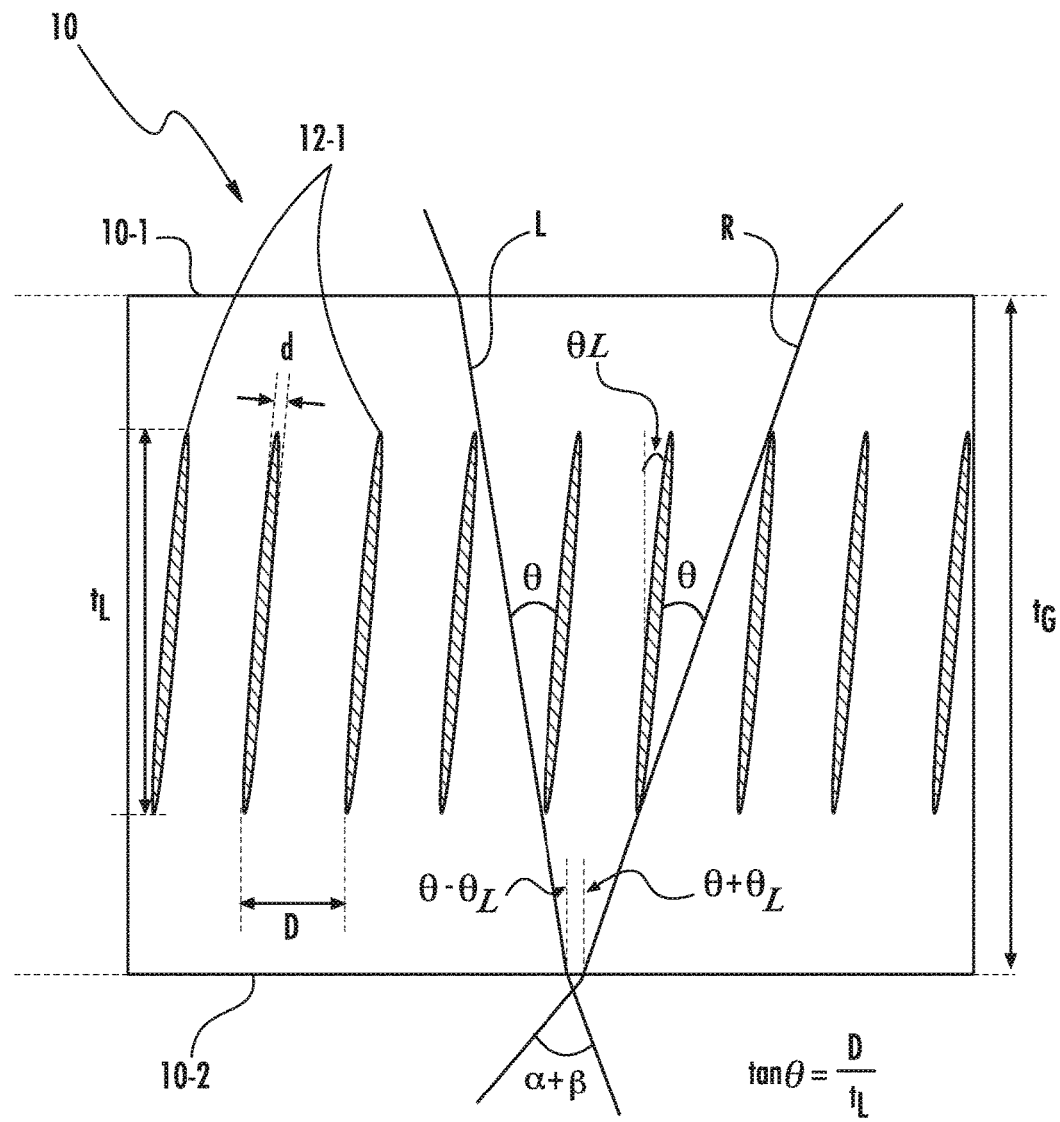
FIG. 21 is a cross-sectional view of an optical sheet with integral microlouvers in accordance with another embodiment.

In reference to FIG. 21, a cross-sectional view of an optical sheet 10 with integral microlouvers 12 in accordance with another embodiment is disclosed. In this embodiment, the damage tracks 12-1 are produced by rotating the substrate 10 relative to the imaging assembly 20 such that the damage tracks 12-1 are skewed relative to major surfaces 10-1 and 10-2) of the substrate 10. (See, e.g., FIG. 1B). Here, the longitudinal axis of the damage tracks 12-1 is disposed at an angle $\theta_L$ from a perpendicular line bisecting the major surface 10-1 of the substrate 10. As before, the angle θ in the glass is selected to form a triangle, where the triangle's hypotenuse (Hyp.) touches the bottom of one microlouver 12 and the top of an adjacent microlouver 12 such that the opposite side of the triangle (Opp.) equals the row spacing D of the microlouvers 12 and the adjacent side of the triangle is defined by the damage track depth $T_L$. The angle θ in the glass, and hence the viewing angle $V_L$, is determined by the relationship:

$$\tan \theta = opp/adj. = D/t_L \qquad (6)$$

In this instance, however, the angle α' between the perpendicular line and the hypotenuse L is:

$$\alpha' = \theta - \theta_L \qquad (7)$$

And, the angle β' between the perpendicular line and the hypotenuse R is:

$$\beta' = \theta + \theta_L \qquad (8)$$

The viewing angle $V_L$ in the air is given by the expression:

$$V_L = \alpha + \beta \qquad (9)$$

As before, the angles in the air are related to the angles in the glass by Snell's law, and thus:

$$n \sin \alpha = n \sin(\theta - \theta_L) = n \sin \alpha', \text{ and}$$

$$n \sin \beta = n \sin(\theta + \theta_L) = n \sin \beta' \qquad (10)$$

Briefly, the angled louvers 12 provide for a non-normal viewing angle.

Figure 22:
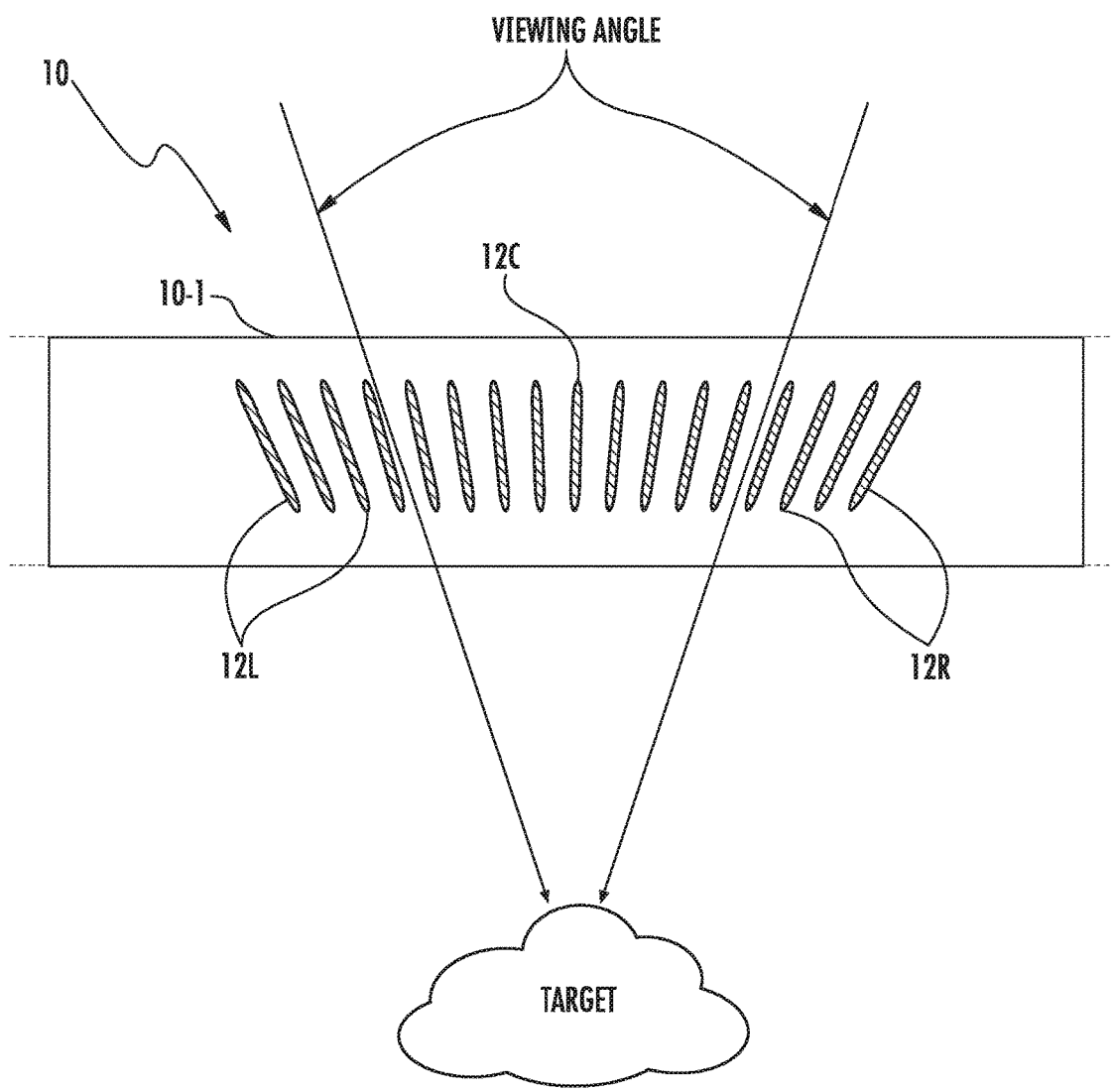
FIG. 22 is a cross-sectional view of an optical sheet with integral microlouvers in accordance with another embodiment.
Figure 23:
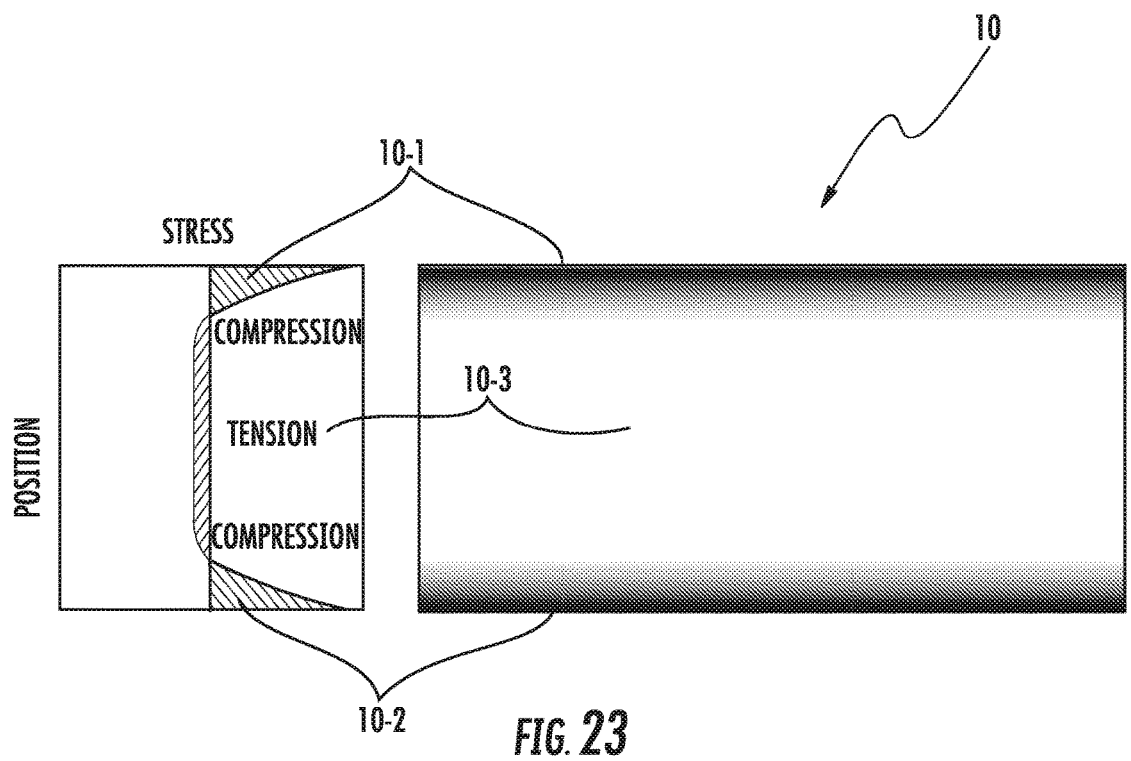
FIG. 23 is a cross-sectional view of an optical sheet in accordance with another embodiment.

Referring to FIG. 22, a cross-sectional view of an optical sheet 10 with integral microlouvers 12 in accordance with another embodiment is disclosed. In this embodiment, the optical sheet 10 includes a central microlouver 12C that has a longitudinal axis that is substantially collinear with the perpendicular (relative to the major surface 10-1). The microlouvers 12L to the left of the centerline (coincident with the central micro louver 12C), are increasingly rotated to the left as a function of their distance from the centerline. In other words, the first row of micro louvers 12L disposed adjacent to the center is slightly rotated whereas the leftmost row of microlouvers 12L is rotated to a much greater degree. In substantially the same way, the microlouvers 12R to the right of the centerline are increasingly rotated to the right as a function of their distance from the centerline. As shown in the drawing, variations in the louver angle across the substrate can be used to provide binocular vision (improved viewing), as when the observer is relatively close to the glass sheet, each eye sees a slightly different angle of transmission through the glass. Likewise, if the observer is more distant from the glass, the structure of FIG. 22 can be used to create a situation where only a specific region or object may be observed, as only light emitted or scattered off that object will pass through the louvers that are angled to point directly toward it. Finally, the inverse of the previously applied situation may be created—the viewer and the target in FIG. 22 may be swapped. If the viewer is placed in the location to which all of the louvers are pointed, then only that specific viewer will be able to see through the glass piece, with other viewers will see the glass as being opaque and scattering.

In reference to FIG. 23, a cross-sectional view of an optical sheet 10 in accordance with another embodiment is disclosed. In this embodiment, the optical sheet 10 is implemented using a glass substrate 10 that is pre-treated to have outer compression layers (10-1, 10-2) and an inner tensile region 10-3. As an example, the compression layers are produced by an ion-exchange method and the louvers 12 are embedded in the tensile region between the compression layers. As another example the compression layers are produced by heat-treatment (thermal tempering) method and the louvers 12 are embedded in the tensile region between the compression layers. In another example, the thermal or chemical tempering may take place after the glass louvers are formed in the sheet.

Figure 24:
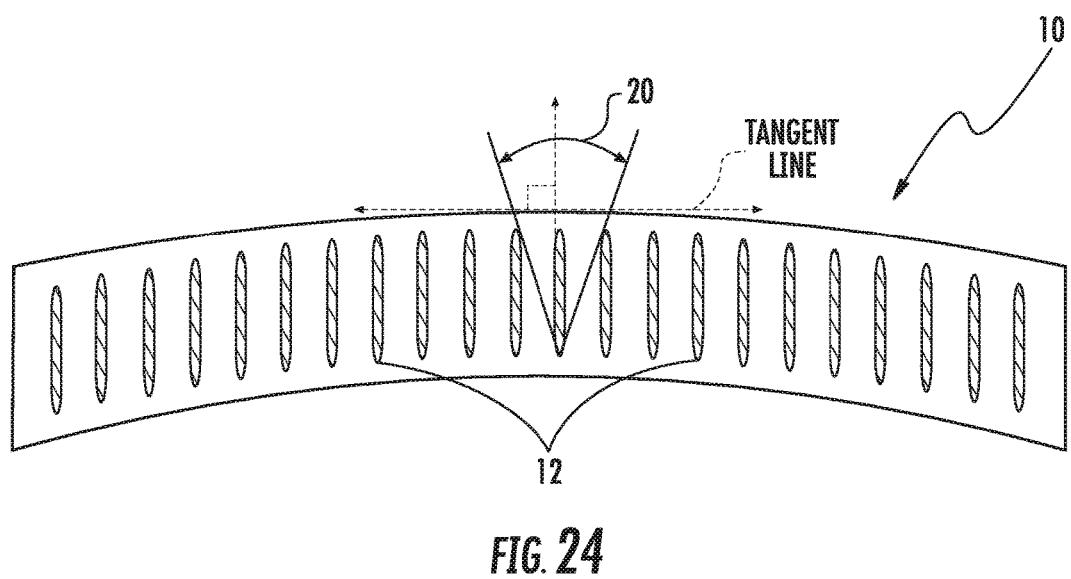
FIG. 24 is a cross-sectional view of an optical sheet with integral microlouvers in accordance with another embodiment.

In reference to FIG. 24, a cross-sectional view of an optical sheet 10 with integral microlouvers 12 in accordance with another embodiment is disclosed. In this embodiment, the optical sheet 10 is implemented using a curvilinear substrate. The viewing angle is such that the light source, or the viewer, must be substantially aligned to the microlouvers 12 or there will be scattering. The microlouver geometry is similar to that employed in FIG. 10; the difference being that the viewing angle is relative to the perpendicular of a center tangent line.

Figure 25:
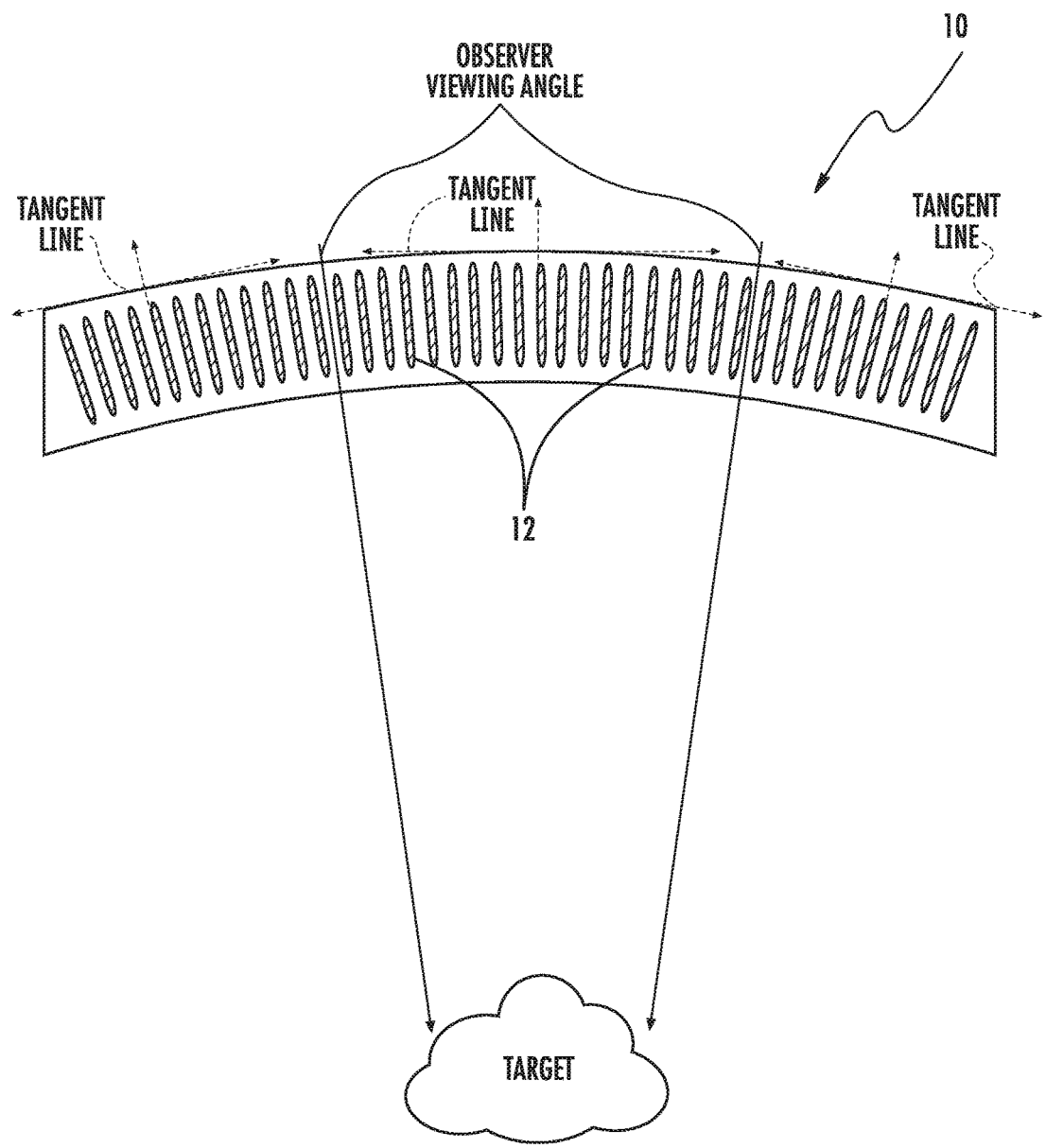
FIG. 25 is a cross-sectional view of an optical sheet with integral microlouvers in accordance with another embodiment.

In reference to FIG. 25, a cross-sectional view of an optical sheet 10 with integral microlouvers 12 in accordance with another embodiment is disclosed. In this embodiment, the optical sheet 10 is implemented using a curved (non-planar) or spherical substrate. The microlouver geometry is also similar to that employed in FIG. 10. Here, the difference is that the viewing angle is relative to the perpendicular of a tangent line at each microlouver location. Thus, as the observer moves relative to the surface of the substrate 10, the viewing angle will also shift relative to the tangent of the normal.

In reference to FIGS. 24 and 25, microlouvers 12 may be formed in non-planar (or spherical) optical sheets 10. In one approach, the louvers 12 can be formed directly in an existing non-planar substrate 10. Alternatively, the microlouvers 12 may be formed in a planar sheet 10 that is further processed to conform to the non-planar geometry.

As embodied herein and depicted in FIGS. 26A-26C, various views of an optical assembly 100 incorporating an optical sheet 10 with integral microlouvers 12 in accordance with another embodiment is disclosed. In this embodiment, a light source 50 is configured to direct a light beam toward the optical sheet 10. The light source 50 may be implemented (as shown in the drawing) as an image projector; or alternatively, the image projector could be suitable for providing motion pictures, light patterns or multi-colored lights for light wall-washing effects. In the example provided in FIG. 26B, an image of a dove is directed onto the optical substrate 10 by the light source 50. The observer (i.e., camera) is substantially disposed within the viewing angle so that the image is translucent and can barely be seen. If the viewer is disposed outside the viewing angle, then the image will appear to be solid (See FIG. 26C).

Figure 27:
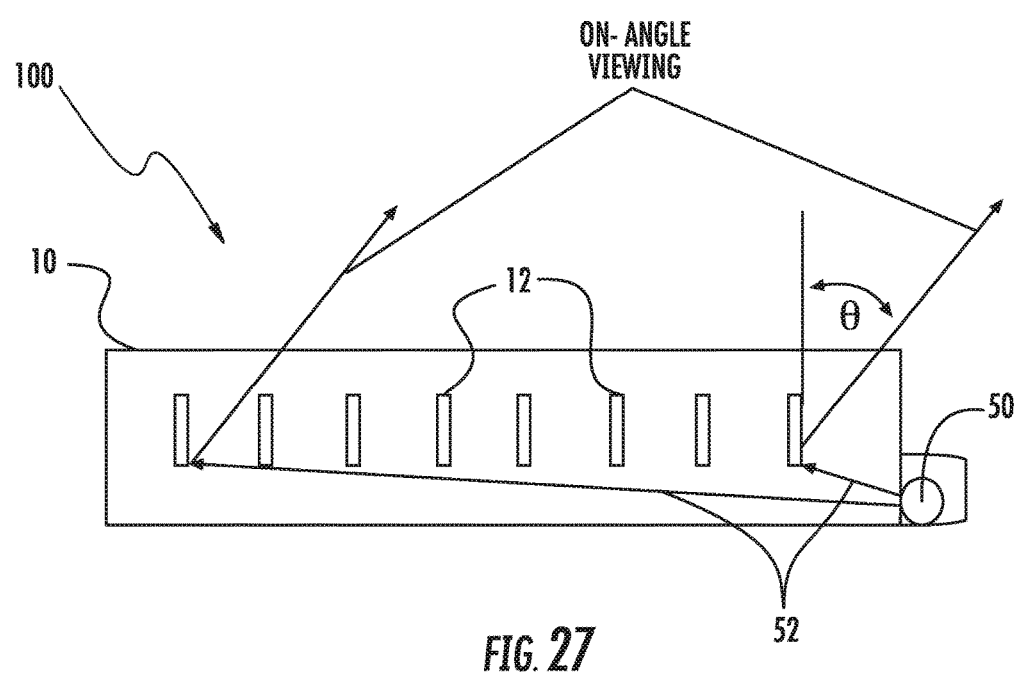
FIG. 27 is a cross-sectional view of an optical assembly incorporating an optical sheet with integral microlouvers in accordance with another embodiment.

As embodied herein and depicted in FIG. 27, a cross-sectional view of an optical assembly 100 incorporating an optical sheet 10 with integral microlouvers 12 in accordance with yet another embodiment is disclosed. In this embodiment, a light source 50 is directly coupled to the optical sheet 10. In one embodiment, the light source 50 is implemented as an optical fiber that extends around the edge, or perimeter, of the glass substrate. Reference is made to U.S. Published Patent Application No. US2012/0275745, which is incorporated herein by reference as though fully set forth in its entirety, for a more detailed explanation of a system and method for coupling light in a transport sheet using a light-diffusing optical fiber.

In another embodiment, the light source 50 is implemented using LEDs (e.g., red, green, blue). The optical assembly 100 thus includes the optical sheet 10 coupled to the light source (comprising LEDs 50). The LEDs are disposed at, and coupled to, the edge of the optical sheet 10 such that LED light 52 is directed into the glass substrate 10. In one embodiment, the LED light 52 can be initially trapped within the optical sheet 10 by total internal reflection until it is incident the microlouvers 12. In another embodiment, the LED light 52 is directed toward the microlouvers 12 by an optical imaging system that includes optical elements such as lenses or mirrors. The LED light 52 is directed outwardly by the microlouvers 12 and visible by a viewer disposed within the proper viewing angle. Depending on the light source and the implementation, the embodiment of FIG. 27 may be employed for architectural illumination, or it may be used in an application similar to that depicted in FIGS. 26A-26C.

EXAMPLES

The various embodiments disclosed herein are further clarified by the following examples. Various experiments were conducted using 0.7-mm Gorilla glass samples and 4.0 mm to 5.75 mm soda-lime samples. The louvers were completely embedded within the glass to provide structural stability; none of the embedded samples have broken due to the damage tracks. Some of the glass samples were thick relative to the laser's line focus length, so that multiple passes were required to get appropriately sized damage tracks. After optimizing the process, the laser power and optics were modified to generate the microlouvers in a single pass. Nonetheless, the experimentation and optimizing steps showed that layers of microlouvers could indeed be stacked over top of each other (See FIG. 10).

The following laser conditions were found to be suitable for creating micro-louvers in soda-lime glass, in a manner so as to create a strong optical effect but so as to also not generate so much damage as to cause part failure:

Wavelength 1064 nm, pulse width ~9.2 psec
    2 laser pulses/burst (20 nsec between pulses)
    Energy/burst~125 uJ
    5 um pitch between damage tracks
    Line focus length~2.5 mm long (FWHM); 1/e^2 diameter~4 microns The above created damage tracks in the glass were about 1.5 mm in spatial extent.

For 4 mm thick soda-lime glass, 4 passes were made at different average focal depths which changed in height by about 0.5 mm for each pass. This created damage tracks that overlapped vertically, but had a total extent of about 3 mm.

For 6 mm thick soda-lime glass, 4 passes were made at different average focal depth within the glass was changed by about 1 mm for each pass. This created damage tracks that overlapped vertically, and had a total extent of about 4.5 mm.

Other laser conditions were possible (higher or lower pulse energy, adjustments in line focus length, different pulses/burst, etc.) However, it was noted that if the focus conditions were used that created damage tracks extending to either the top or bottom surface of the glass, cracks would quickly propagate between the damage tracks and the part would catastrophically fail within minutes, or perhaps a few days. However, the above listed conditions created parts where damage tracks did not extend to either the top or bottom surface of the glass, so any cracks did not propagate, and parts showed no apparent degradation over periods of months.

Many of the samples were essentially colorless with some diffraction effects visible in reflected light. When viewed at a normal incidence angle, the microlouvers are very nearly invisible; but, they are visible under close inspection. Off-axis, the microlouvers transmit a blurred or hazy image. The opacity of the transmitted light can be controlled in the manner described herein (e.g., louvers comprised of multiple rows). Both modeling and experimentation show that the opacity stays roughly constant with angle.

Various samples were made to determine the effect of changing the various design parameters: row spacing D, damage track diameter d, damage track pitch Λ, etc. described herein. For example, laser pitch along the louvers was varied from 3.0, 5.0 and 10 microns. While this changed the diffractive properties of the louvers (i.e. the rainbow effect for reflected light), it did little to impact the scattering of the louver surfaces. Spacing between louvers was varied from 100, 200, 400, 550, 600, 700 and 1000 microns. This changed the angular properties: e.g., the 100-micron spacing produced a substrate with a very narrow viewing window) (±1°); and the 1000-micron spacing produced a 10× larger viewing angle (±10°). A very pleasing visual appearance was obtained in samples using approximately 400-500 micron spacing.

In other examples, the depths (total length perpendicular to the glass surface) of the damage tracks were varied from about 1.0 mm to about 4.0 mm. These experiments show that damage track depth provides an independent method of changing the viewing angle. In another experiment, microlouvers were made at different depths and were disposed in different directions. This technique provided angular dependence in two directions (i.e., vertically and horizontally). In another experiment, angular dependence was provided in four directions at 45° to each other.

In yet another experiment, microlouvers were made with multiple closely-spaced passes of the laser. This produced a slightly thicker micro louver with higher scattering and opacity.

In another experiment, the word "Corning" was written on a large sheet (see FIGS. 20A, B) and showed that angular dependent text could be provided in accordance with embodiments of the present disclosure.

In another experiment, an image was projected onto a microlouvered sheet to demonstrate the feasibility of using the optical assembly as an image projector. In this experiment, the image was only visible off axis. See, FIGS. 26A-C.

It will be apparent to those skilled in the art that various modifications and variations can be made without departing from the spirit or scope of the claims.

What is claimed is:

1. An optical assembly comprising:
a transparent substrate having a first major surface and a second major surface substantially opposite the first major surface, the transparent substrate having a predetermined thickness measured as a distance between the first major surface and the second major surface, the transparent substrate including at least one damage layer substantially disposed between a first non-damage layer and a second non-damage layer, the first non-damaged layer substantially including the first major surface and the second non-damaged layer substantially including the second major surface; and
a plurality of elongated laser-induced damage tracks disposed within the at least one damaged layer to form at least one area pattern, wherein light directed toward the transparent substrate at an angle that exceeds a predetermined viewing angle ($\theta$) is scattered by the plurality of laser-induced damage tracks, and wherein light directed toward the transparent substrate at an angle that is less than the predetermined viewing angle ($\theta$) is transmitted by the transparent substrate.

2. The assembly of claim 1, wherein each of the plurality of laser-induced damage tracks are disposed in a plurality of rows and are characterized by a predetermined length ($t_L$) substantially corresponding to a thickness of the at least one damaged layer, and at least one predetermined row spacing (D), and wherein the predetermined viewing angle ($\theta$) is a function of the at least one predetermined row spacing (D) and the predetermined length ($t_L$).

3. The assembly of claim 2, wherein the function is substantially equal to $\tan \theta = D/t_L$.

4. The assembly of claim 1, wherein the at least one damaged layer includes a plurality of damaged layers stacked between the first non-damage layer and the second non-damage layer.

5. The assembly of claim 1, wherein the transparent substrate is selected from a group of substrates including glass, fused silica, sapphire, polymers, glass ceramics.

6. The assembly of claim 1, wherein a form factor of the transparent substrate is selected from a plurality of form factors including substantially planar, curved, cylindrical or spherical.

7. The assembly of claim 1, wherein the at least one area pattern includes a plurality of predetermined area patterns.

8. The assembly of claim 1, wherein the at least one area pattern is selected: from a group of area patterns that include at least one lower pattern, a human readable indicia pattern, an alpha-numeric indicia pattern, a watermark pattern, a commercial logo pattern, a graphical image pattern.

9. The assembly of claim 8, wherein the at least one louver pattern is selected from a group of louver patterns that includes a louver pattern having a plurality of substantially parallel rows, a louver pattern having a plurality of substantially parallel rows intersected at a predetermined intersecting angle by a plurality of substantially parallel columns, the predetermined intersecting angle being a right angle or an acute angle, or a louver pattern wherein the at least one damaged layer includes a plurality of damaged layers.

10. The assembly of claim 1, wherein adjacent laser-induced damage tracks are substantially separated by at least one pitch distance (A).

11. The assembly of claim 10, wherein the at least one pitch distance (A) is selected from a group of randomized pitch distances, the group of randomized pitch distances being characterized by a mean pitch distance or an average pitch distance.

12. The assembly of claim 2, wherein at least one row of the plurality of rows includes a two-dimensional array of laser-induced damage tracks.

13. The assembly of claim 1, wherein a longitudinal dimension of the plurality of laser induced damage tracks is disposed normal to the first major surface or the second major surface.

14. The assembly of claim 1, wherein a longitudinal dimension of the plurality of laser-induced damage tracks is disposed at an angle relative to the first major surface or the second major surface.

15. The assembly of claim 1, further comprising a light source coupled to an edge portion defining a perimeter of the transparent substrate, the light source being configured to direct at least one light beam into the transparent substrate via the edge portion, at least a portion of the at least one light beam being reflected by the at least one predetermined area pattern into an ambient space in a direction corresponding to the predetermined viewing angle, and wherein the light source is selected from a group of light sources including at least one LED, at least one optical fiber, or a lens element of an image projection device.

16. A method of making an optical assembly using an imaging system that includes a pulsed laser and an optical system configured to form a pulsed laser beam that is focused to create at least one focal line, the method comprising:

providing a predetermined mapping pattern that is configured to position a plurality of elongated laser-induced damage tracks within at least one damage layer substantially disposed between a first non-damage layer and a second non-damage layer of a transparent substrate; and operating the imaging system to implement the predetermined mapping pattern, wherein operating the imaging system includes forming each of the plurality of elongated laser-induced damage tracks by generating the at least one focal line, the plurality of elongated laser-induced damage tracks forming an area pattern corresponding to the predetermined mapping pattern, whereby light directed toward the transparent substrate at an angle that exceeds a predetermined viewing angle ($\theta$) is scattered by the plurality of laser-induced damage tracks.

17. The method of claim 16, wherein the at least one focal line is generated by forming a Gauss-Bessel beam.

18. The method of claim 16, wherein operating the imaging system further comprises:

providing a relative motion between the transparent substrate and the imaging system in accordance with the at least one predetermined mapping pattern; and generating the at least one focal line to substantially form an elongated laser-induced damage track in one pass.

19. The method of claim 16, wherein a form factor of the transparent substrate is selected from a plurality of form factors including substantially planar, curved, or spherical, and wherein the area pattern is selected from a group of area patterns that include at least one louver pattern, a human readable indicia patterns, an alpha-numeric indicia pattern, a watermark pattern, and a commercial logo pattern.

20. The method of claim 19, wherein the at least one louver pattern is selected from a group of louver patterns that includes a plurality of substantially parallel rows, a grid louver pattern having a plurality of substantially parallel rows intersected at a predetermined intersecting angle by a plurality of substantially parallel columns, and wherein the predetermined intersecting angle is a right angle or an acute angle.

* * * * *

UNITED STATES PATENT AND TRADEMARK OFFICE
CERTIFICATE OF CORRECTION

PATENT NO. : 10,429,553 B2  
APPLICATION NO. : 15/552417  
DATED : October 1, 2019  
INVENTOR(S) : Dana Craig Bookbinder et al.

Page 1 of 1

It is certified that error appears in the above-identified patent and that said Letters Patent is hereby corrected as shown below:

On the Title Page

On page 2, Column 2, item (56), other publications, Line 24, delete "Proc. of" and insert -- Proc. --, therefor.

On page 2, Column 2, item (56), other publications, Line 37, delete "Galss" and insert -- Glass --, therefor.

In the Claims

In Column 18, Line 33, Claim 8, delete "lower" and insert -- louver --, therefor.

In Column 18, Line 47, Claim 10, delete "(A)." and insert -- ($\Lambda$). --, therefor.

In Column 18, Line 49, Claim 11, delete "(A)" and insert -- ($\Lambda$) --, therefor.

Signed and Sealed this  
Eleventh Day of February, 2020

Andrei Iancu  
*Director of the United States Patent and Trademark Office*